United States Patent
Komatsu et al.

(10) Patent No.: US 7,324,274 B2
(45) Date of Patent: Jan. 29, 2008

(54) MICROSCOPE AND IMMERSION OBJECTIVE LENS

(75) Inventors: Koichiro Komatsu, Tokyo (JP); Hiromasa Shibata, Yokohama (JP)

(73) Assignee: Nikon Corporation, Tokyo (JP)

( * ) Notice: Subject to any disclaimer, the term of this patent is extended or adjusted under 35 U.S.C. 154(b) by 265 days.

(21) Appl. No.: 11/018,487

(22) Filed: Dec. 22, 2004

(65) Prior Publication Data
US 2005/0179997 A1  Aug. 18, 2005

(30) Foreign Application Priority Data

Dec. 24, 2003 (JP) ............................. 2003-428276
Feb. 23, 2004 (JP) ............................. 2004-046407
Aug. 13, 2004 (JP) ............................. 2004-235866

(51) Int. Cl.
*G02B 21/26* (2006.01)
(52) U.S. Cl. ...................... 359/391; 359/368
(58) Field of Classification Search ........ 359/391–394, 359/368; 250/309–311; 355/53
See application file for complete search history.

(56) References Cited

U.S. PATENT DOCUMENTS

| | | | |
|---|---|---|---|
| 5,610,683 A | | 3/1997 | Takahashi |
| 6,580,087 B1 * | | 6/2003 | Suzuki et al. ............ 250/559.4 |
| 6,867,844 B2 * | | 3/2005 | Vogel et al. .................. 355/30 |
| 7,012,673 B2 * | | 3/2006 | Kolesnychenko et al. .... 355/53 |
| 7,130,037 B1 * | | 10/2006 | Lange ...................... 356/237.2 |
| 2004/0125351 A1 * | | 7/2004 | Krautschik .................. 355/53 |
| 2004/0263959 A1 * | | 12/2004 | Dixon et al. ................ 359/385 |

FOREIGN PATENT DOCUMENTS

| | | |
|---|---|---|
| JP | A 6-124873 | 5/1994 |
| JP | A 7-77657 | 3/1995 |
| JP | A 2001-118896 | 4/2001 |
| WO | WO 99/49504 A1 | 9/1999 |
| WO | WO 2004/053955 A1 | 6/2004 |

* cited by examiner

*Primary Examiner*—Joshua L Pritchett
(74) *Attorney, Agent, or Firm*—Oliff & Berridge, PLC

(57) ABSTRACT

A microscope includes a microscope optical system that forms an enlarged image of an observation position by an immersion objective lens with an immersion liquid is filled between the observation position and the objective lens, a moving mechanism that moves a state that a first observation position among a plurality of observation positions on a substrate is positioned in a field of view of the microscope to another state that a second observation position is positioned in the field of view of the microscope, an immersion supplier that supplies the immersion liquid to fill between the objective lens and the observation position, an immersion remover that removes the immersion liquid filled between the objective lens and the observation position, and an immersion remove controller that makes the immersion remover remove the immersion liquid before operating the moving mechanism.

20 Claims, 12 Drawing Sheets

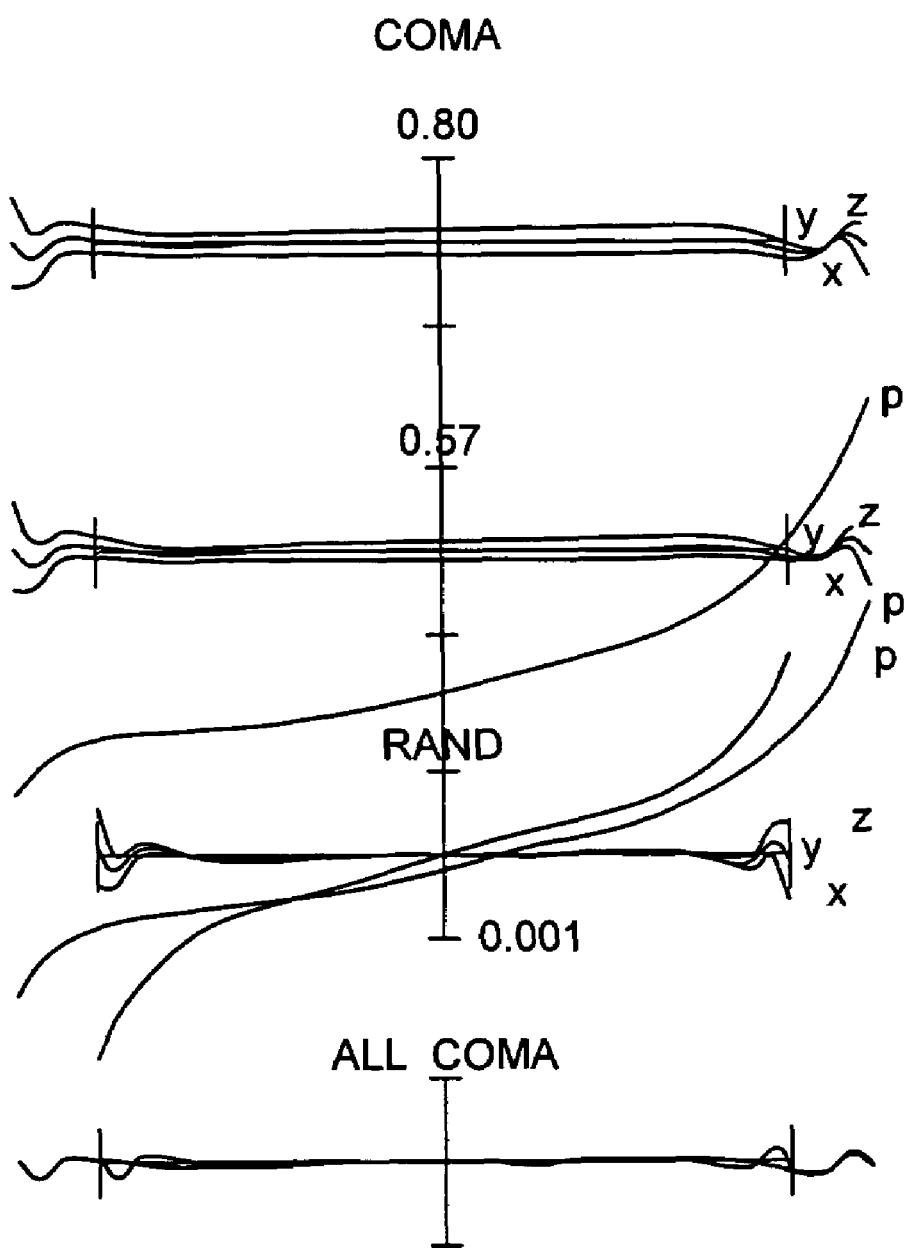

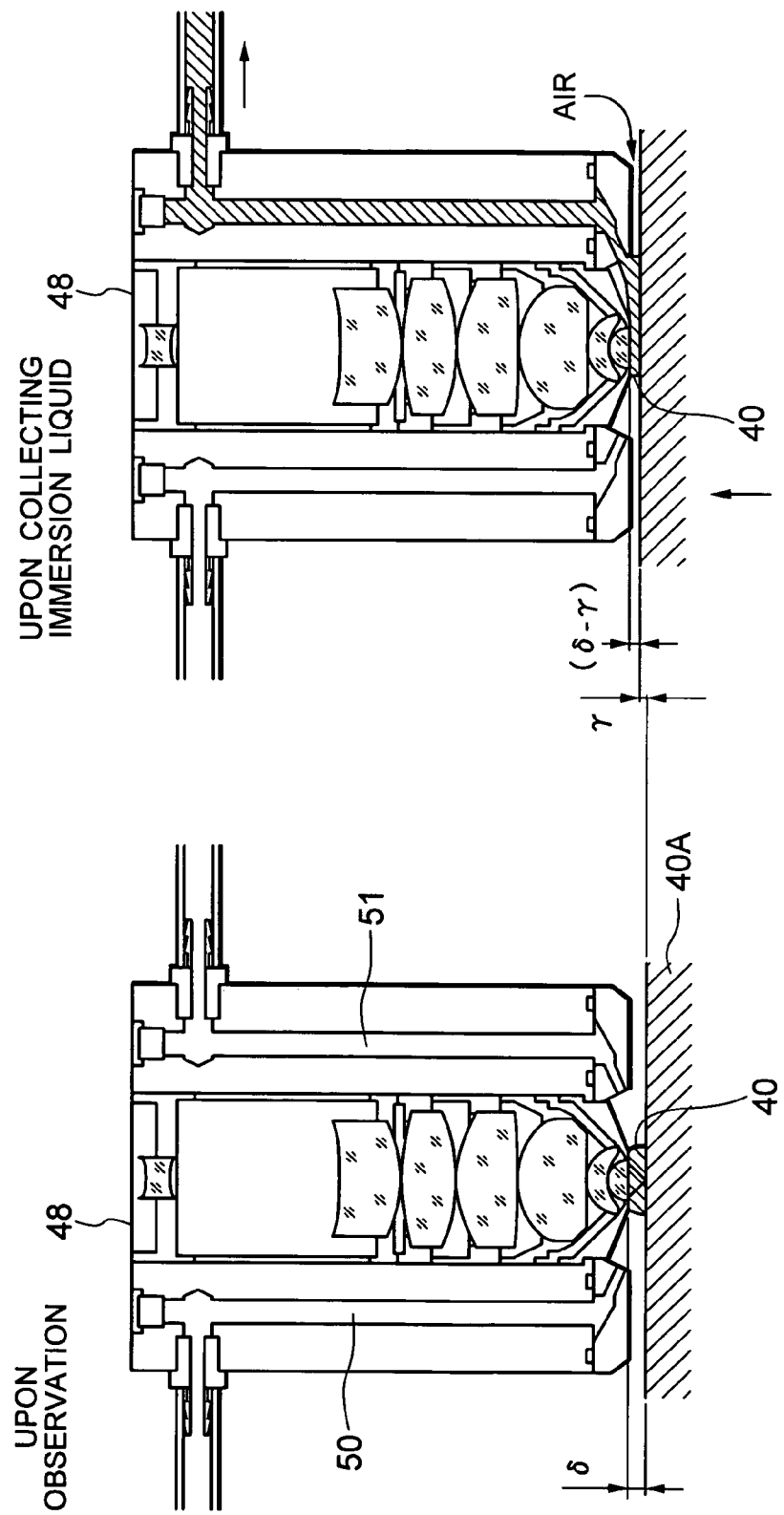

MICROSCOPE AND IMMERSION OBJECTIVE LENS

This application claims the benefit of Japanese Patent Applications No. 2003-428276, No. 2004-046407 and No. 2004-235866 which are hereby incorporated by reference.

BACKGROUND OF THE INVENTION

1. Field of the Invention

The present invention relates to a microscope and an immersion objective lens used for observing a semiconductor wafer and a liquid crystal substrate.

2. Related Background Art

In manufacturing semiconductor circuit devices or liquid crystal display devices, observations on defects or foreign bodies in a circuit pattern formed on a semiconductor wafer or a liquid crystal substrate (which are generally called a "substrate") have been carried out by a microscope. Here, a microscope in this specification is an optical microscope system combined with an automatic transfer mechanism. There are two kinds of objective lenses one of which is a dry type in which a gas such as air and the like is filled between an object to be observed and an objective lens of the microscope system, and the other is a immersion type in which a liquid is filled between an object to be observed and an objective lens of the microscope system. By the way, the observation using the microscope system is corresponding to an inspection for observing the state and cause of defects or foreign bodies detected by a pattern defect inspection system.

Recently, a device for observing a substrate with visible light and ultraviolet light has been proposed (for example, Japanese Patent Application Laid-Open No. 2001-118896). The device is also a dry type. On using ultraviolet light, since resolving power is proportional to the wavelength to be observed, the substrate can be observed with higher resolving power than on using visible light. In the device disclosed in Japanese Patent Application Laid-Open No. 2001-118896, by combining observation with low resolving power upon using visible light and that with high resolving power upon using ultraviolet light, a substrate can be effectively observed.

However, since the device described above uses ultraviolet light, the kind of light source and optical materials of the observation system including an objective lens are limited to expensive ones, so that manufacturing cost and running cost become excessively high. Moreover, in order to improve resolving power with the above-described device using ultraviolet light, wavelength of the illumination light must be further shortened, so that the light source becomes excessively costly and also has a problem of stability.

SUMMARY OF THE INVENTION

The object of the present invention is to provide a microscope and an immersion objective lens capable of changing over, if necessary, from an observation with low resolving power to that with high resolving power upon observing a substrate and also capable of making it to be high resolving power at a low cost.

A microscope according to the present invention includes a microscope optical system that forms an enlarged image of an observation position by an immersion objective lens with an immersion liquid is filled between the observation position and the objective lens, a moving mechanism that moves a state that a first observation position among a plurality of observation positions on a substrate is positioned in a field of view of the microscope to another state that a second observation position is positioned in the field of view of the microscope, an immersion supplier that supplies the immersion liquid to fill between the objective lens and the observation position, an immersion remover that removes the immersion liquid filled between the objective lens and the observation position, and an immersion remove controller that makes the immersion remover remove the immersion liquid before operating the moving mechanism.

In the microscope according to the present invention, it is preferable that the moving mechanism is composed of a stage that holds the substrate having a plurality of observation positions movably in a given area, and a stage controller that drives the stage on the basis of position information of the plurality of observation positions on the substrate, and wherein the stage controller drives the stage such that after the immersion liquid is removed by the immersion remover, a next observation position comes to the field of view of the objective lens.

In the microscope according to the present invention, it is preferable that an automatic adjuster that adjusts a focusing state of the microscope after the immersion liquid supplied by the immersion supplier is filled between a tip of the objective lens and the substrate before the immersion liquid is removed by the immersion remover is further included.

In the microscope according to the present invention, it is preferable that the immersion remover has an absorbing nozzle and a tip of the absorbing nozzle is arranged in the vicinity of a tip of the objective lens.

In the microscope according to the present invention, it is preferable that the immersion supplier has a discharge nozzle and a tip of the discharge nozzle is arranged in the vicinity of a tip of the objective lens.

In the microscope according to the present invention, it is preferable that the liquid supplier has a discharge nozzle, a tip of the discharge nozzle is arranged to a given position in the vicinity of the substrate, the stage controller moves the observation position to right under the tip of the discharge nozzle, the immersion liquid is supplied to the observation position from the discharge nozzle, then the observation position supplied with the immersion liquid is moved to the field of view of the objective lens, and an image of the observation position is formed by the microscope.

In the microscope according to the present invention, it is preferable that the immersion supplier supplies at least an amount of the immersion liquid filling the space between the tip of the objective lens and the substrate in the state of forming the enlarged image.

In the microscope according to the present invention, it is preferable that a microscope optical system that forms images of the plurality of observation positions by a dry objective lens, a memory that stores a position of a given observation position among the plurality of observation positions on the basis of the images of the plurality of observation positions formed by the dry objective lens, and a controller that controls the moving mechanism to move the position of the observation position stored in the memory to the field of view of the immersion objective lens in turn on the basis of the position information stored in the memory, and forms an image of each observation position by the immersion objective lens are included.

In the microscope according to the present invention, it is preferable that a microscope optical system that forms images of the plurality of observation points by a dry objective lens, a first controller that controls the moving mechanism to position the plurality of observation positions to a field of view of the dry objective lens in turn and forms an image by the dry objective lens, a judge means that judges whether an image is to be formed by the immersion objective lens or not after forming an image by the dry objective lens, and a second controller that controls the moving mechanism to position the observation position to the field of view of the immersion objective lens and forms an image by the immersion objective lens when the judged result of the judge means is to carry out observation by the immersion objective lens are included.

In the microscope according to the present invention, it is preferable that a microscope optical system that forms images of the plurality of observation points by a dry objective lens, a first controller that controls the moving mechanism to position the plurality of observation positions to a field of view of the dry objective lens in turn and forms an image by the dry objective lens, a memory that stores position information of the observation position when an image is to be formed by the immersion objective lens after forming an image by the dry objective lens, and a second controller that controls the moving mechanism to position the observation position to the field of view of the immersion objective lens on the basis of the position information stored in the memory and forms an image by the immersion objective lens are included.

In the microscope according to the present invention, it is preferable that the immersion liquid is pure water.

In the microscope according to the present invention, it is preferable that the working distance of the immersion objective lens is 0.1 mm or more and 0.5 mm or less.

In the microscope according to the present invention, it is preferable that the immersion objective lens forms an image of the substrate with ultraviolet light.

An immersion objective lens using for a microscope according to the present invention, each of all lens elements composing the immersion objective lens being a single lens element.

In the microscope according to the present invention, it is preferable that the immersion supplier supplies the amount of immersion liquid corresponding to a volume V0 satisfied by the following expression:

$$V0 = V1 \cdot V2$$

where V1 denotes a volume of a cylindrical space between a tip of the objective lens and the observation position, V2 denotes a volume of an annular space capable of sticking out from the tip of the objective lens by a surface tension.

where V1 denotes a volume of a cylindrical space between a tip of the objective lens and the observation position, V2 denotes a volume of an annular space capable of sticking out from the tip of the objective lens by a surface tension.

In the microscope according to the present invention, it is preferable that the annular space with the width A of the amount of sticking out from the tip of the objective lens satisfies the following conditional expression:

$$\delta/2 \leq A \leq 2\delta$$

where δ denotes the working distance of the objective lens.

where δ denotes the working distance of the objective lens.

In the microscope according to the present invention, it is preferable that an immersion liquid supply controller that controls the immersion supplier to start supplying the immersion, and to stop supplying the immersion when the amount of supply of the immersion reaches the volume V0 is included.

In the microscope according to the present invention, it is preferable that a positioning means that positions the observation position in the vicinity of the optical axis of the objective lens within the focal plane of the objective lens while the immersion liquid is supplied to the observation position is included and the immersion remover has an absorbing part for absorbing the immersion liquid in the vicinity of the tip of the objective lens, and removes the immersion liquid from the observation position by bringing the substrate near to the objective lens in the positioned state by the positioning means.

In the microscope according to the present invention, it is preferable that a first positioning means that positions the substrate to a plane located farther away from the objective lens than the focal plane of the objective lens, and a second positioning means that positions the observation position in the vicinity of the optical axis of the objective lens on the focal plane of the objective lens while the immersion liquid is supplied to the observation position are included and the immersion supplier supplies the immersion liquid to the observation position of the substrate in the state where the substrate is positioned to the plane located farther away, and the immersion remover has an absorbing portion for absorbing the immersion liquid locating in the vicinity of the tip of the objective lens and removes the immersion liquid from the observation position with bringing the substrate near to the objective lens from the state positioned by the second positioning means.

In the microscope according to the present invention, it is preferable that the immersion supplier supplies the immersion liquid to a target locating in the vicinity of the optical axis on the plane located farther away, and the first positioning means positions the observation position on the substrate in the vicinity of the optical axis on the plane located farther away.

The microscope according to the present invention makes it possible to changing over, if necessary, from an observation with low resolving power to that with high resolving power upon observing a substrate and also capable of making it to be high resolving power at a low cost.

BRIEF DESCRIPTION OF THE DRAWINGS

FIG. 8 shows graphs of various aberrations according to the objective lens 48A.

FIGS. 12A and 12B are side views showing the state of the liquid 40 upon observation and that when a Z-stage is moved upward upon collection, respectively.

DETAILED DESCRIPTION OF THE PREFERRED EMBODIMENTS

Embodiments of the present invention is fully explained below with reference to accompanying drawings.

First Embodiment

Figure 1:
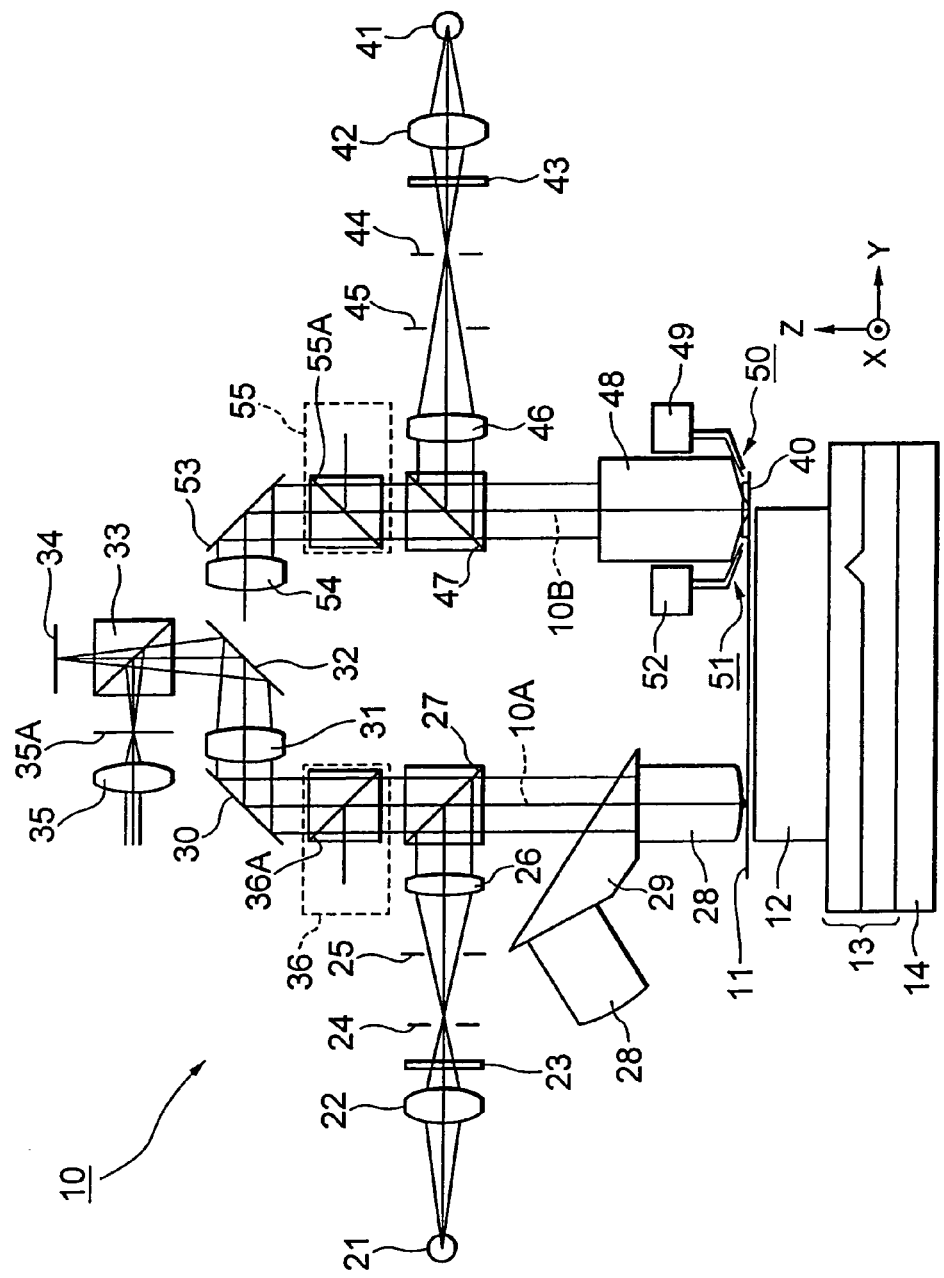
FIG. 1 is a schematic drawing showing the whole construction of a microscope 10 according to a first embodiment of the present invention.

As shown in FIG. 1, a microscope 10 according to the first embodiment is composed of stages (12 through 14) for holding a substrate 11 to be observed, an observing portion (21 through 35) and a focus detector 36 for a dry-objective system, an observing portion (41 through 54, 32 through 35) and a focus detector 55 for a liquid immersion-objective system, and a controller (not shown). The substrate 11 is such as a semiconductor wafer or a liquid crystal substrate. The microscope 10 is used for effecting an observation (visual inspection) of defects or foreign bodies on a circuit pattern formed on the substrate 11 upon manufacturing semiconductor circuit devices or liquid crystal display devices. When observing the substrate 11, observation with low resolving power and with high resolving power can be changed over if necessary (described later in detail). The circuit pattern is formed as a resist pattern.

Stages (12 through 14) are explained. Stages (12 through 14) are composed of a sample table 12, an XY-stage 13, and a Z-stage 14. The sample table 12 is movable within a horizontal plane by means of the XY-stage 13 and in a vertical direction by the Z-stage 14. After adjusting orientation of a circuit pattern, a substrate 11 transferred from, for example, a developer by a transfer system (not shown) is placed on the sample table 12 and fixed by such as a vacuum chuck. Orientation adjustment of the circuit pattern is carried out on the basis of a notch or an orientation flat when the substrate 11 is a semiconductor wafer. The substrate 11 can be moved within a predetermined area in a horizontal plane by means of the sample table 12 and the XY-stage 13. The predetermined area corresponds to a movable area of the XY-stage 13.

At a predetermined position in the movable area of the XY-stage 13, observation of the substrate 11 held on stages (12 through 14) with visible light is carried out by the observing portion (21 through 35) for dry-objective system. At another position within the movable area of the XY-stage 13 (other than the position of the observing portion (21 through 35) for dry-objective system), observation of the substrate 11 held on stages (12 through 14) with visible light is carried out by the observing portion (41 through 54, and 32 through 35) for the immersion-objective system.

In other words, the observation position (XY position of the optical axis 10A) of the observing portion (21 through 35) for a dry-objective system is separated from the observation position (XY position of the optical axis 10B) of the observing portion (41 through 54, and 32 through 35) for an immersion-objective system by a predetermined distance within the movable area of the common stages (12 through 14). Moreover, the focusing height (Z-position) of the objective lens 28 for the observing portion (21 through 35) for a dry-objective system is substantially equal to that of the objective lens 48 for the observing portion (41 through 54, and 32 through 35) for an immersion-objective system. Here, "substantially equal" means that the difference in each focus height (Z-position) is within the allowable range an autofocus mechanism of the observing portion (21 through 35) for a dry-objective system.

Accordingly, observation with the observing portion (21 through 35) for a dry-objective system and that with the observing portion (41 through 54, and 32 through 35) for an immersion-objective system can easily be changed over by moving the substrate 11 together with the sample table 12 horizontally. In this case, when the horizontal moving amount is made to coincide with the distance between the optical axis 10A and the optical axis 10B, an observation position on the substrate 11 intersecting the optical axis 10A, for example, can be positioned to the observation position intersecting the optical axis 10B. The optical axis 10A corresponds to the center of field of view for the observing portion (21 through 35) for a dry-objective system and the optical axis 10B corresponds to the center of field of view for the observing portion (41 through 54, and 32 through 35) for an immersion-objective system.

Then, resolving power is explained. Since the objective lenses 28 and 48 for the microscope 10 have a small field of view, as to imaging property, they are considered to be virtually ideal optical systems with well corrected aberrations. Resolving power R for two points (the distance between two adjacent points with equal quantity of light enable to be resolved) of an ideal optical system without aberration is expressed by "R=0.61×λ/N.A.", where λ denotes the wavelength of the light used for imaging, and N.A. denotes the numerical aperture of the objective lens.

The numerical aperture N.A. is expressed by "N.A.=n×sin θ", where θ denotes the maximum value of an angle between a light ray come out from a point in the field of view and incident to the objective lens and the optical axis, which angle is the exit angle of that light ray, and n denotes refractive index of the medium between the objective lens and the substrate.

When the space between the objective lens 28 of the observing portion (21 through 35) for a dry-objective system and the substrate 11 is filled with air, since refractive index n of the air is nearly "1", the maximum value of the numerical aperture N.A. of the objective lens 28 is about 0.95. When an objective lens with the numerical aperture of 0.95 is used and the wavelength λ of the light used for imaging is 550 nm (visible light), resolving power for two points becomes 353 nm.

On the other hand, when the space between the objective lens 48 of the observing portion (41 through 54, and 32 through 35) for an immersion-objective system and the substrate 11 is filled with water, and the wavelength λ of the light used for imaging is 550 nm (visible light), refractive index n of the water is about "1.33". Accordingly, since approximately the same incident angle θ is applied, the numerical aperture N.A. of the objective lens 48 becomes about 1.25, so that when the wavelength λ of the light used for imaging is 550 nm (visible light), resolving power for two points becomes 268 nm.

In a microscope, the field of view observed by an eyepiece is generally fixed. The diameter of the field of view in the image plane 35A is about 25 mm. The magnification of an objective lens denotes a projection magnification from the object plane 11 to the image plane 35A. Accordingly, when an observation magnification is determined, the real field of view capable of being observed in the object plane 11 is determined as a matter of course. In microscope, the relation between the magnification of the objective lens and numerical aperture, resolving power, real field of view, depth of focus is shown in Table 1.

TABLE 1

|  | Magnification | Numerical Aperture | Resolving Power | Real Field of View | Depth of Focus |
| --- | --- | --- | --- | --- | --- |
| Dry | 10× | 0.30 | 1118 nm | 2.5 mmφ | 7.82 µm |
| Dry | 20× | 0.45 | 746 nm | 1.25 mmφ | 2.95 µm |
| Dry | 50× | 0.80 | 419 nm | 0.5 mmφ | 0.79 µm |
| Dry | 100× | 0.90 | 372 nm | 0.25 mmφ | 0.50 µm |
| Dry | 150× | 0.95 | 353 nm | 0.167 mmφ | 0.40 µm |
| Water | 150× | 1.25 | 268 nm | 0.167 mmφ | 0.33 µm |

Accordingly, observation with lower magnification makes it possible to observe wider area of the object plane 11 to be observed at a time. Moreover, since the numerical aperture of an objective lens with lower magnification is small, depth of focus becomes deep, the observable area becomes large three-dimensionally. When further detailed structure is to be observed, you may increase resolving power by changing the objective lens to have higher magnification. However, you have to observe with closely focusing because the depth of focus becomes shallow. When the difference in the object height becomes larger than the depth of focus, it may happen that the object is observed upon being moved along the optical axis of the objective lens.

As described above, the microscope 10 according to the first embodiment makes it possible to observe the substrate 11 with a large field of view and low resolving power by means of the observing portion (21 through 35) for a dry-objective system, and to observe the substrate 11 with high resolving power by means of the observing portion (41 through 54, and 32 through 35) for an immersion-objective system under the same illumination light. Accordingly, by observing the substrate 11 with high resolving power by means of the observing portion (41 through 54, and 32 through 35) for an immersion-objective system after observing with a large field of view and low resolving power by means of the observing portion (21 through 35) for a dry-objective system, it becomes possible to observe the substrate 11 effectively. Detailed procedure for the observation is going to be explained later.

The observing portion (21 through 35) for a dry-objective system is explained. In the observing portion (21 through 35), a light source 21 such as a halogen lamp and a metal halide lamp, a collector lens 22, a wavelength selection filter 23, and an aperture stop 24 are arranged. The collector lens 22 converges the light emitted from the light source 21 and forms an image of the light source 21 on the aperture stop 24. The wavelength selection filter 23 selectively transmits visible light with a predetermined wavelength range.

In the observing portion (21 through 35), a field stop 25, a condenser lens 26, a diverging prism 27, and the objective lens 28 are arranged. The objective lens 28 is attached on a revolver 29 capable of being rotated around an axis other than the optical axis 10A. A plurality of objective lenses 28 having different magnification with each other are provided on the revolver 29. By turning the revolver 29 the objective lens 28 can be changed over, so that observation magnification can be changed. The space between the objective lens 28 and the substrate 11 on the optical axis 10A is filled with air or nitrogen (dry-system).

Visible light passing through the aperture stop 24, after passing through the field stop 25, becomes collimated light through the condenser lens 26, reflected by the diverging prism 27, and is led to the objective lens 28 on the optical axis 10A. The objective lens 28 on the optical axis 10A converges the visible light from the diverging prism 27 and leads to the substrate 11 which is in dry state. As a result, the substrate 11 is illuminated by the visible light. The aperture stop 24 is conjugate with the exit pupil of the objective lens 28 and defines the incident angle range of the illumination light to the substrate 11. The field stop 25 defines an illumination range of the substrate 11.

The observation light (such as reflected light) generated from the substrate 11 by the above-described illumination is again led to the objective lens 28, thereby becoming collimated light, and passes through the diverging prism 27. Behind the diverging prism 27, a focus detector 36 (explained later) is arranged. The focus detector 36 is a mechanism for detecting the state of focusing (amount of defocus) of the substrate 11 with respect to the objective lens 28 on the optical axis 10A.

On downstream of the focus detector 36, a mirror 30, an imaging optical system 31, an optical path change mirror 32, a diverging prism 33, an imaging device 34, and an eyepiece 35 are arranged in the observing portion (21 through 35) for a dry-objective system. Among the observation light from the substrate 11, the light passing through the diverging prism 27 and a diverging prism 36A of the focus detector 36 is converged by these optical elements (30 through 33). As a result, an enlarged image (pattern image) of the substrate 11 is formed on each of the imaging plane of the imaging device 34 and the field position 35A of the eyepiece 35.

In the observing portion (21 through 35) for a dry-objective system, an observation position of the substrate 11 positioned on the optical axis 10A by using visible light (such as the wavelength of 400 nm to 700 nm) can be observed with low resolving power (such as resolving power of two points of 353 nm at the wavelength of 550 nm). Moreover, by changing the objective lens 28 on the optical axis 10A, observation magnification can be changed. Accordingly, after observing with relatively low resolving power, an observing target on the substrate 11 can be caught on the field of view upon observing with high resolving power.

Figure 2:
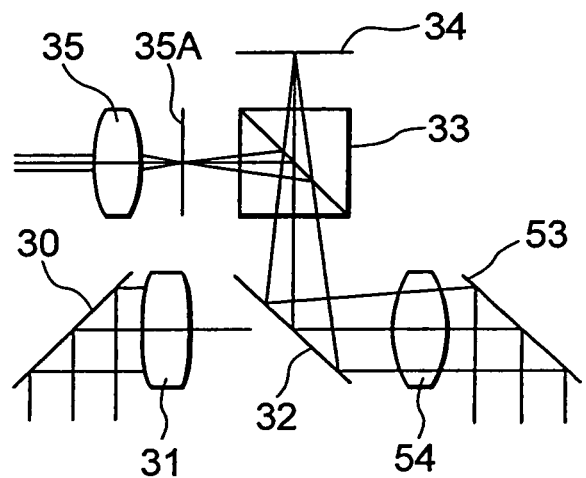
FIG. 2 is a schematic drawing showing another arrangement of an optical path change mirror 32 according to the first embodiment of the present invention.

Although the optical path change mirror 32 is arranged to reflect the observation light from the imaging optical system 31 to lead to the diverging prism 33 as shown in FIG. 1 upon observing by the observing portion (21 through 35) for a dry-objective system, the optical path change mirror 32 is arranged in a direction as shown in FIG. 2 upon observing by the observing portion (41 through 54, and 32 through 35) for an immersion-objective system as explained next. Changeover between such two arrangement states can be carried out automatically by the controller by means of a driver (not shown).

The observing portion (41 through 54, and 32 through 35) for an immersion-objective system is explained. The observing portion (41 through 54, and 32 through 35) for an immersion-objective system has a larger numerical aperture relative to the observing portion (21 through 35) for a dry-objective system. In the observing portion (41 through 54, and 32 through 35) for an immersion-objective system, a light source 41 such as a halogen lamp and a metal halide lamp, a collector lens 42, a wavelength selection filter 43, and an aperture stop 44 are arranged. The collector lens 42 converges the light emitted from the light source 41 and forms an image of the light source 41 on the aperture stop 44. The wavelength selection filter 43 selectively transmits visible light with a predetermined wavelength range.

In the observing portion (41 through 54, and 32 through 35), a field stop 45, a condenser lens 46, a diverging prism 47, and the objective lens 48 are arranged. The objective lens 48 is firmly fixed to the main body of the microscope 10. The space between the tip (lower surface) of the objective lens 48 and the substrate 11 is filled with an immersion medium of a liquid 40 upon observing with high resolving power by the observing portion (41 through 54, and 32 through 35) for an immersion-objective system. The optical system of the objective lens 48 is designed such that aberrations are corrected when the space between the tip of the objective lens 48 and the substrate 11 is filled with the liquid 40.

In the embodiment of the present invention, such as pure water is used as the liquid 40. Pure water can be obtained easily in large quantities in such as semiconductor manufacturing process. In addition, since pure water does not have harmful effect to the resist on the substrate 11, nondestructive test for the substrate 11 becomes possible. Moreover, since pure water does not have harmful effect on the environment and has extremely low content of impurities, the effect of washing the surface of the substrate 11 can be expected.

The liquid 40 is supplied by a liquid supplier 49 through a discharge nozzle 50, and collected by a liquid collector 52 through an absorbing nozzle 51. The tips of the discharge nozzle 50 and the absorbing nozzle 51 are arranged adjacent to the slope in the vicinity of the tip of the objective lens 48. The liquid supplier 49 is equipped with a liquid tank and a pressure pump and discharges a given amount of the liquid 40 to the discharge nozzle 50. As a result, the given amount of the liquid 40 discharged through the tip of the discharge nozzle 50 reaches the space between the tip of the objective lens 48 and the substrate 11 along the slope of the objective lens 48.

Here, in order to form a "droplet" by the liquid 40 supplied to the space between the tip of the objective lens 48 and the substrate 11, it is preferable that the working distance (in other words, the distance between the tip of the objective lens 48 and the substrate 11) of the objective lens 48 is set to 0.1 mm or more and 0.5 mm or less. In this case, the amount of pure water is best to be 0.1 cc to 0.2 cc. Although the shorter the working distance becomes the smaller the amount of pure water suffices, when the working distance is less than the above-mentioned lower limit (0.1 mm), it may happen that the pattern on the substrate 11 is broken by interfering the tip of the objective lens 48 and the substrate upon moving stages (12 through 14) horizontally. On the other hand, when the working distance exceeds the above-mentioned upper limit (0.5 mm), a sufficient numerical aperture to obtain high resolving power cannot be secured, so that high resolving power cannot be achieved.

In a biological microscope, there exists an immersion objective lens with magnification of 60, the numerical aperture N.A.=1, and the working distance of 2 mm. When an objective lens 48 with the numerical aperture N.A. of 1 or more (such as 1.25) is used, in order to prevent to become unnecessarily large in designing an objective lens, it is preferable that the working distance thereof is set to 0.1 mm to 0.3 mm. By setting the working distance to 0.1 mm or more, it can be prevented that the tip of the objective lens 48 interferes with the substrate 11 upon moving stages (12 through 14) horizontally.

The mechanism to supply/collect the liquid 40 is explained in further detail. The mechanism is composed of the above-mentioned liquid supplier 49, the discharge nozzle 50, the absorbing nozzle 51, and the liquid collector 52.

Figure 9A:
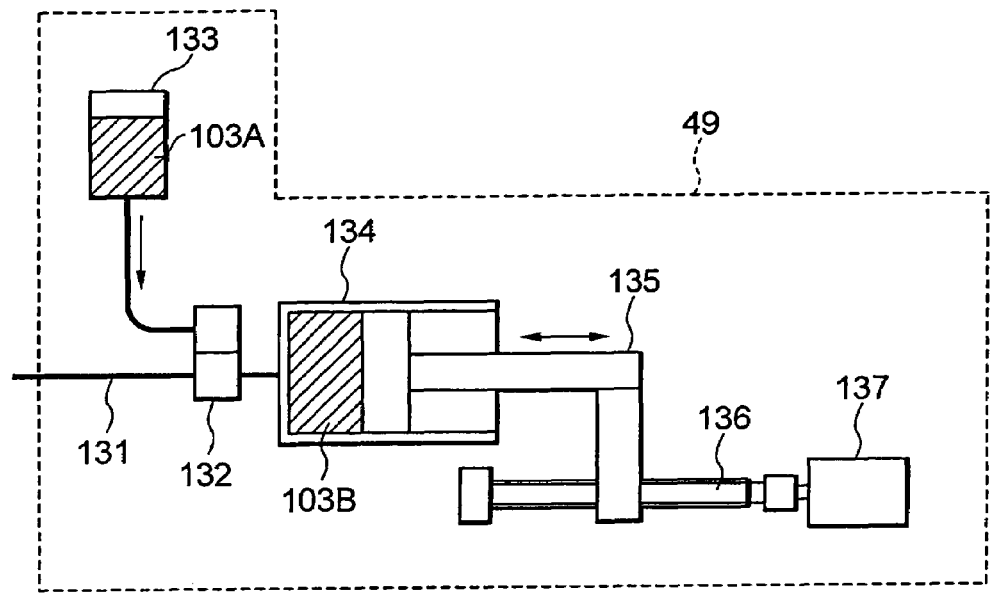
FIGS. 9A and 9B are schematic drawings showing a constructions of a liquid supplier and a liquid collector, respectively.

FIG. 9A is a schematic drawing showing a construction of a liquid supplier 49. The liquid supplier 49 is composed of a pipe 131 connected with the discharge nozzle 50, an electromagnetic valve 132 arranged in the middle of the pipe 131 changeable between two positions, a liquid tank 133 for storing fresh, clean liquid 103A, and a pressure pump (134 through 137). The pressure pump (134 through 137) is composed of a cylinder 134, a piston 135, a lead screw 136, and a motor 137.

The piston 135 connected with the lead screw 136 which converts power of the motor 137 into linear motion is movable reciprocally with any speed. The moving speed of the piston 135 is adjustable in accordance with the rotation speed of the motor 137. The moving direction of the piston 135 corresponds to the rotational direction of the motor 137.

The cylinder 134 is connected to the liquid tank 133 through a first channel of the electromagnetic valve 132 and to the discharge nozzle 50 through a second channel. In the electromagnetic valve 132, the two channels are never opened at a time and always either one of them is opened and connected. In the first channel, the electromagnetic valve 132 connects/cuts off the channel between the cylinder 134 and the liquid tank 133. In the second channel, the electromagnetic valve 132 connects/cuts off the channel between the cylinder 134 and the discharge nozzle 50.

In a state that the first channel is opened by the electromagnetic valve 132 and the cylinder 134 is connected to the liquid tank 133, when the piston 135 is moved to the right in the drawing, the liquid 103A in the liquid tank 133 can be introduced into the cylinder 134 as shown by the liquid 103B.

In a state that the second channel is opened by the electromagnetic valve 132 and the cylinder 134 is connected to the discharge nozzle 50, when the piston 135 is moved to the left in the drawing, the liquid 103B in the cylinder 134 can be sent out to the discharge nozzle 50. The sent out liquid 103B is discharged from the tip of the discharge nozzle 50 and reaches between the tip of the objective lens 48 and the substrate 11 as shown by the liquid 40. In this way, the liquid 40 is supplied by the liquid supplier 49 through the discharge nozzle 50. The liquid 40 is supplied automatically by the controller (not shown) before observation with the immersion objective.

The amount of the liquid 10B sent out from the cylinder 134 to the discharge nozzle 50 (in other words, an amount of supply V of the liquid 40) is equal to the product of the cross section S of the cylinder 134 multiplied by the moving amount X of the piston 135 ($V = S \cdot X$) and arbitrarily adjustable with the moving amount X. The speed of the supply V can arbitrarily be adjusted by the moving speed of the piston 135. It is preferable that the moving speed of the piston 135 is set to be slow enough to be able to prevent the liquid 40 from splash.

If the amount of supply V of the liquid 40 can be adequate, the liquid 40 forms a "droplet" between the tip of the objective lens 48 and the substrate 11 by means of the surface tension. In other words, it is not that the liquid 40 flows out or bubbles cannot be removed. That the liquid 40 flows out happens when the amount of supply V of the liquid 40 is exceeds the limit of the surface tension. In this case, it becomes difficult to completely collect the liquid 40 after observation. Moreover, that bubbles cannot be removed happens when the amount of supply V of the liquid 40 is too small. In this case, it becomes difficult to form a clear image by the objective lens 48. The adequate amount of supply V of the liquid 40 is the amount capable of forming a "droplet"

between the tip of the objective lens 48 and the substrate 11 by means of the surface tension.

Figure 10A:
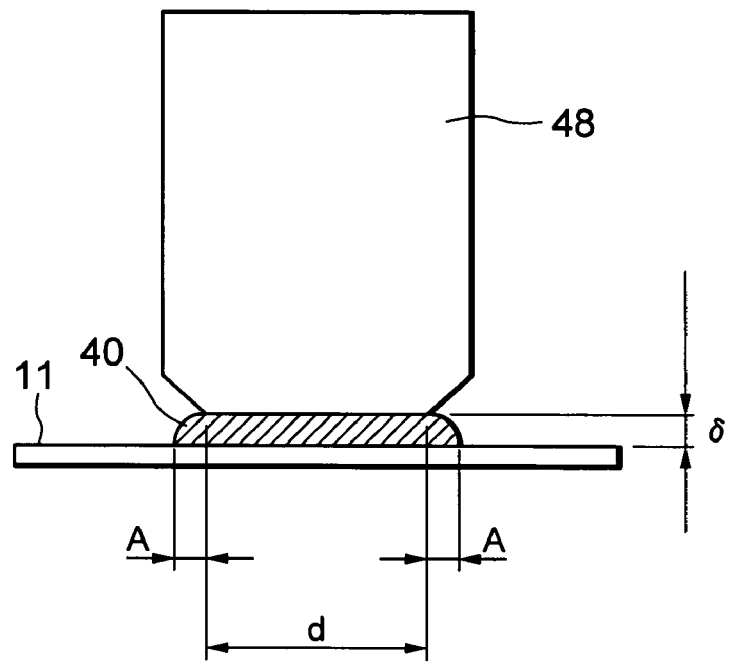
FIGS. 10A and 10B respectively show a side view and a plan view explaining the shape of the liquid 40.
Figure 10B:
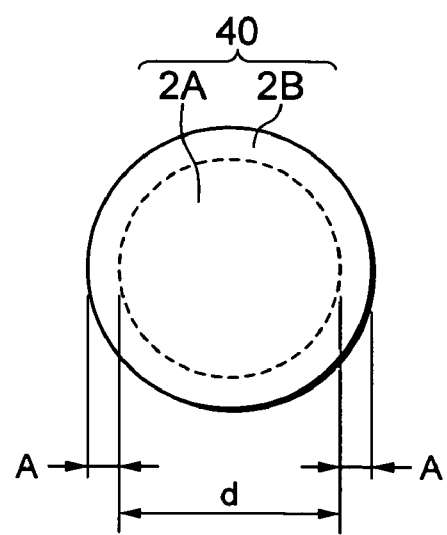

Now, the surface form of the liquid 40 supplied between the tip of the objective lens 48 and the substrate 11 is explained with reference to FIG. 10A. The surface of the liquid 40 means an exposed surface between the tip of the objective lens 48 and the substrate 11. When the amount of supply V of the liquid 40 is adequate, the surface shape tends to become a sphere having minimum area by means of the surface tension. Accordingly, the liquid 40 slightly sticks out from the tip of the objective lens 48 in accordance with the surface tension. In FIG. 10A, the diameter of the tip of the objective lens 48 is denoted by "d" and the width of the sticking out of the liquid 40 from the tip of the objective lens 48 is denoted by "A". FIG. 10B is a drawing that the liquid 40 in FIG. 10A is observed from above.

As described above, when the amount of supply V of the liquid 40 is adequate, the occupied space by the liquid 40 becomes, as shown in FIGS. 10A and 10B, the summation of a cylindrical space 2A between the tip of the objective lens 48 and the substrate 11 and an annular space 2B sticking out from the tip of the objective lens 48 by means of the surface tension. The volume V0 is expressed by the expression (11) by using the volume V1 of the cylindrical space 2A, and the volume V2 of the annular space 2B. The width A of sticking out from the tip of the objective lens 48 is dependent upon the working distance δ of the objective lens 48 and is considered to approximately satisfy the following expression (12):

$$V0 = V1 + V2 \quad (11)$$

$$\delta/2 \leq A \leq 2\delta \quad (12).$$

Accordingly, in the microscope 10 according to the present invention, the volume V0 is calculated in advance as a designed value and the amount in accordance with the volume V0 is made to be the "adequate amount of supply V of the liquid 40". In order to realize the adequate amount of supply V (=volume V0), by using a parameter (cross section S of the cylinder 134) of the liquid supplier 49 the moving amount X of the piston 135 is calculated by the following expression (13):

$$X = V0/S \quad (13).$$

In calculating the adequate amount of supply V (=volume V0), the following values are used such as the diameter d of the tip of the objective lens 48, the working distance δ of the objective lens 48, and the sticking width A from the tip of the objective lens 48. For example, when the sticking width A from the tip of the objective lens 48 is equal to the working distance δ of the objective lens 48, the volume V0 can be calculated by the approximate expression (14) shown below. This is considered the case when the amount of supply V of the liquid 40 is the optimum. In the approximate expression (14), the cross sectional shape of the annular space 2B is assumed to be a quarter circle of the radius of δ.

$$V0 = \pi \int_0^\delta \left\{ \frac{d}{2} + \sqrt{x(2\delta - x)} \right\}^2 dx \quad (14)$$

In the liquid supplier 49 (FIG. 9A), in order to realize the moving amount X of the piston 135 calculated by the expression (13) (in other words, to realize the adequate amount of supply V of the liquid 40), it is preferable that the moving amount X of the piston 135 is precisely controlled by turning the motor 137 to move the lead screw 136. The means for controlling can be considered to be such as an open loop control by using a stepping motor as the motor 137 and a closed loop control by using a rotary encoder or a linear encoder as a motor 137.

Figure 9B:
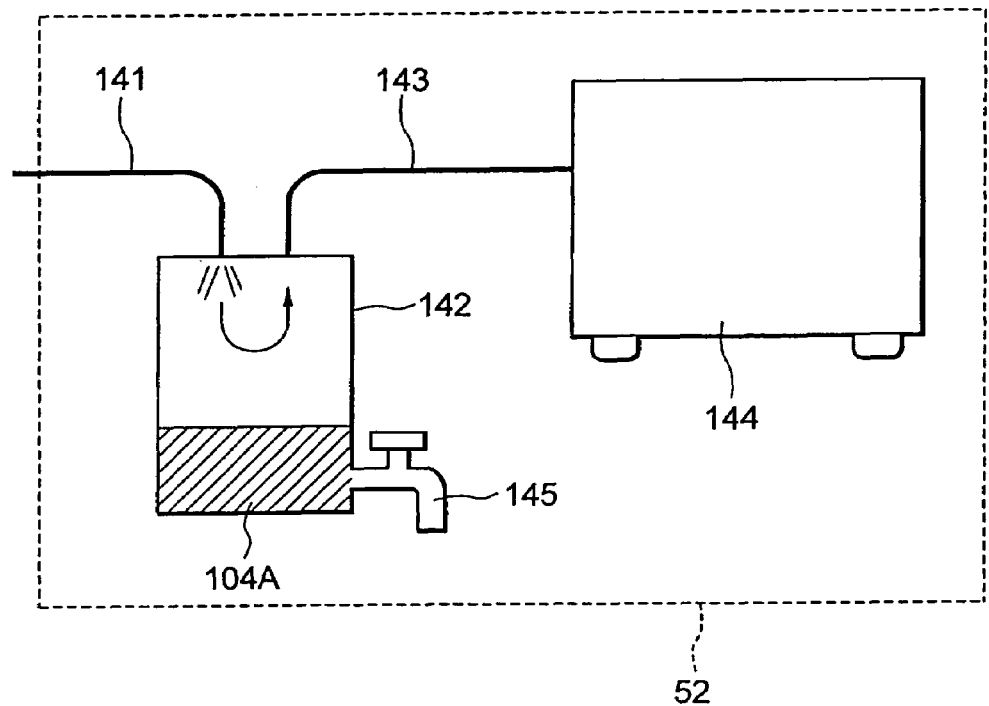

Then, the liquid collector 52 is explained. FIG. 9B is a schematic drawing showing a constructions of a liquid collector. The liquid collector 52 is composed of a liquid waste tank 142 connected to the absorbing nozzle 51 through a pipe 141, and a vacuum pump 144 connected to the liquid waste tank 142 through a pipe 143. The pipes 141 and 143 are connected to the upper portion of the liquid waste tank 142. A cock 145 for discharging liquid waste 104A is attached to the liquid waste tank 142. By the way, instead of the vacuum pump 144, a vacuum equipment (not shown) of a factory may be connected to the pipe 143.

In the liquid collector 52, the liquid 40 between the tip of the objective lens 48 and the substrate 11 together with the surrounding air is absorbed by the vacuum pump 144 through the absorbing nozzle 51 and the like. In other words, the liquid 40 is removed from the substrate 11. The absorbed liquid 40 is led to the liquid waste tank 142 through the pipe 141, separated from the air, dropped down to the liquid waste tank 142, and stored as liquid waste 104A. From the liquid waste 104A, only the air is led to the vacuum pump 144 through the pipe 143. In this manner, the liquid 40 is collected by the liquid collector 52 through the absorbing nozzle 51. Since only air is led to the vacuum pump 144, the vacuum pump 144 is not damaged by flowing in the liquid. A dehydrate filter may be arranged in the middle of the pipe 143. Collection of the liquid 40 is automatically carried out by the controller (not shown) after completing the immersion observation.

Figure 11A:
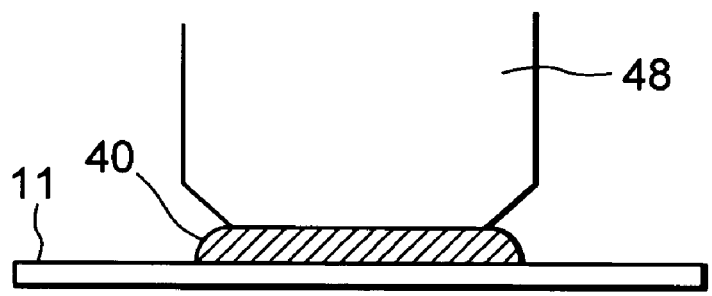
FIGS. 11A, 11B and 11C respectively show side views according to behaviors of the liquid upon being collected.
Figure 11B:
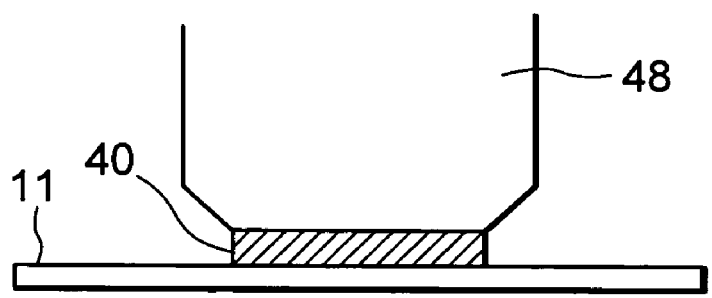
Figure 11C:
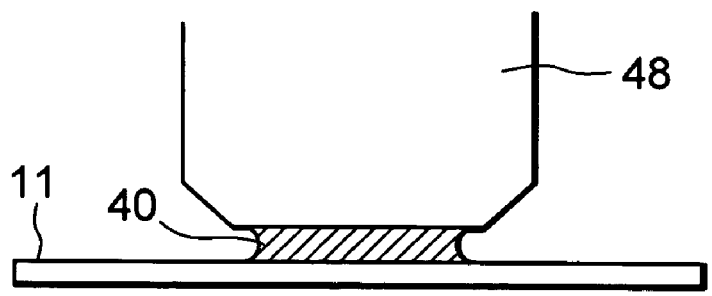

FIGS. 11A, 11B and 11C respectively show side views according to behaviors of the liquid 40 upon being collected by the vacuum pump 144. Before absorbing, as shown in FIG. 11A (as same as FIG. 10A) the shape of the surface (exposed surface) of the liquid 40 is approximately spherical. Upon starting absorption, the shape gradually becomes like FIG. 11B, and the amount of sticking out by means of the surface tension disappears. Finally, as shown in FIG. 11C, the central portion between the tip of the objective lens 48 and the substrate 11 becomes thin, and disappears.

Accordingly, it is preferable that the absorbing rate of the vacuum pump 144 (the rate of vacuum discharge) is set to a condition that the amount of absorption from the absorbing nozzle 51 is larger than the amount of air leak caused by the distance between the tip of the objective lens 48 and the substrate 11. This is obvious even from the Bernoulli's theorem.

In the course of absorption (upon the timing shown in FIG. 11B or 11C), the Z-stage 14 is controlled to slightly move up the sample table 12 within the working distance δ, the substrate 11 is brought near to the objective lens 48 as shown in FIG. 12B, and the distance (δ−γ) between the tip of the objective lens 48 and the substrate 11 is made to be small. In this case, the amount of air leak caused by the distance (δ−γ) can be small in accordance with the amount of rise γ of the substrate 11, so that the liquid 40 left on the substrate 11 can effectively be absorbed.

The amount of rise δ (δ<γ) of the substrate 11 may be set in advance to generally satisfy the following conditional expression:

$$S32A = 2\pi(d/2)(\delta - \gamma)$$

where the left side S32A denotes the whole area of the aperture of the absorbing nozzle 51, and the right side denotes a product of the length of the circumference of the tip (plane portion of the diameter of d) of the objective lens 48 ($2\pi(d/2)$) multiplied by the above-described distance ($\delta-\gamma$), in other words, the lateral area of the cylindrical space formed by the tip of the objective lens 48 and the substrate 11, and approximately proportional to the amount of the air absorption (the amount of air leak).

By setting the amount of rise $\gamma$ ($\gamma<\delta$) of the substrate 11, when the distance ($\delta-\gamma$) between the tip of the objective lens 48 and the substrate 11 is made to be small upon absorbing the liquid 40, the amount of air leak caused by the distance ($\delta-\gamma$) becomes small, so that the liquid 40 left on the substrate 11 can effectively be absorbed. On the other hand, when the above-described conditional expression cannot be satisfied, the rate of the air flown into the absorbing nozzle 51 becomes too large, so that the liquid 40 cannot effectively be absorbed.

In the observing portion (41 through 54, and 32 through 35) for the immersion-objective system, visible light passing through the aperture stop 44, after passing through the field stop 45, becomes collimated light through the condenser lens 46, reflected by the diverging prism 47, and is led to the objective lens 48 on the optical axis 10B. The objective lens 48 on the optical axis 10B converges the visible light from the diverging prism 47 and leads to the substrate 11 which is in immersion state. As a result, the substrate 11 is illuminated by the visible light. The aperture stop 44 is conjugate with the exit pupil of the objective lens 48 and defines the incident angle range of the illumination light to the substrate 11. The field stop 45 defines an illumination range of the substrate 11.

The observation light (such as reflected light) generated from the substrate 11 by the above-described illumination is again led to the objective lens 48, thereby becoming collimated light, and passes through the diverging prism 47. Behind the diverging prism 47, a focus detector 55 (explained later) is arranged. The focus detector 55 is a mechanism for detecting the state of focusing (amount of defocus) of the substrate 11 with respect to the objective lens 48 on the optical axis 10B.

On downstream of the focus detector 55, a mirror 53, an imaging optical system 54, an optical path change mirror 32 in the arrangement state shown in FIG. 2, a diverging prism 33, an imaging device 34, and an eyepiece 35 are arranged in the observing portion (41 through 54, and 32 through 35) for the immersion-objective system. Among the observation light from the substrate 11, the light passing through the diverging prism 47 and a diverging prism 55A of the focus detector 55 is converged by these optical elements (53,54, 32, and 33). As a result, an enlarged image of the substrate 11 is formed on each of the imaging plane of the imaging device 34 and the field position 35A of the eyepiece 35.

In the observing portion (41 through 54, and 32 through 35) for the immersion-objective system, an observation position of the substrate 11 positioned on the optical axis 10B by using visible light (such as the wavelength of 550 nm) can be observed with high resolving power (such as resolving power of two points of 268 nm). By using the observing portion (41 through 54, and 32 through 35) for the immersion-objective system, it becomes possible to observe with higher resolving power than the observing portion (21 through 35) for the dry-observation system.

The focus detectors 36 and 55 are explained. The focus detector 36 is a mechanism for detecting the state of focusing (amount of defocus) of the substrate 11 with respect to the objective lens 28 on the optical axis 10A upon observing with the observing portion (21 through 35) for the dry-observation system. On the other hand, the focus detector 55 is a mechanism for detecting the state of focusing (amount of defocus) of the substrate 11 with respect to the objective lens 48 on the optical axis 10B upon observing with the observing portion (41 through 54, and 32 through 35) for the immersion-objective system. The controller (not shown) of the microscope 10 controls the Z-stage 14 for automatically adjusting the state of focusing of the substrate 11 (AF control) on the basis of the detecting result of the focus detector 36 or 55.

Figure 3:
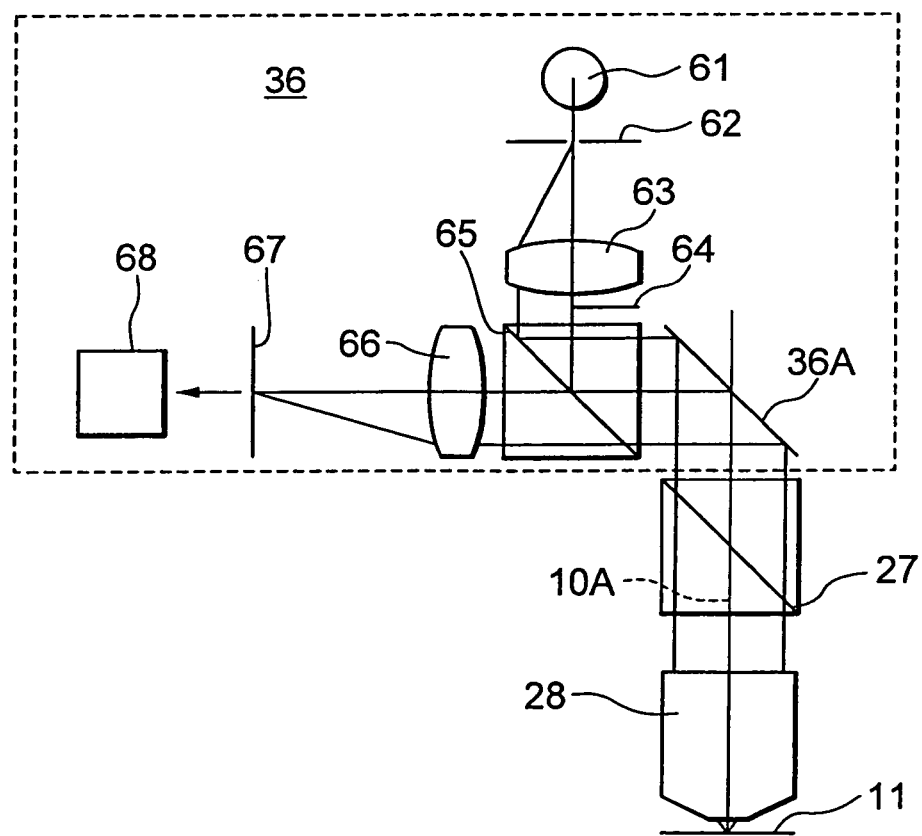
FIG. 3 is a schematic drawing showing a construction of a focus detector 36 according to the first embodiment of the present invention.

As shown in FIG. 3, in the focus detector 36, the light emitted from a light source 61 illuminates a slit 62, is roughly collimated by a lens 63, and is incident to a shield plate 64. The shield plate 64 shields a half of the light passing through the slit 62. The light passing through the shield plate 64 is reflected by a diverging prism 65, and 36A, and led to the objective lens 28 through the diverging prism 27. As a result, the image of the slit is projected on the substrate 11. The reflected light (AF detection light) on the substrate 11 is converged again by the objective lens 28, passes through the diverging prisms 27, 36A, and 65, and is converged by an imaging lens 66, so that the slit image is formed on a one-dimensional imaging device 67. A signal processor 68 detects the position of the center of gravity of the slit image on the one-dimensional imaging device 67, so that the amount of defocus of the substrate 11 is derived on the basis of the position.

Since the basic construction of the focus detector 55 is the same as that of the focus detector 36, the explanation of the focus detector 55 is carried out with reference to FIG. 3. The focus detector 55 is composed of the optical elements (61 through 67) shown in FIG. 3, the signal processor 68, and the diverging prism 55A shown in FIG. 1. In the immersion-objective system, the Z-stage 14 is controlled on the basis of the detected result (amount of defocus) of the focus detector 55 with correcting by the amount divided by refractive index of the liquid 40 as an immersion medium.

Then, observation procedure of the substrate 11 by the microscope 10 according to the first embodiment is explained. The observation procedure of the substrate 11 is carried out in accordance with the procedure of the flowchart shown in FIG. 4 by the controller (not shown) with automatic control.

In step S1, the substrate 11 to be observed is brought to the stages (12 through 14) and fixed on the sample table 12 after adjusting the direction of the circuit pattern formed on the substrate 11. In step S2, the revolver 29 of the observing portion (21 through 35) for the dry-observation system is rotated if necessary, and the objective lens 28 is set in the state of low magnification observation. In step S3, an observation position of the substrate 11 fixed in advance is positioned at the center of the field of view of the observing portion (21 through 35) for the dry-observation system by controlling the XY-stage 13. In this case, the XY-stage 13 is controlled so that the observation position is positioned at the center of the field of view of the observing portion (21 through 35) for the dry-observation system.

In step S4, AF control is started, and the focusing state of the substrate 11 is automatically adjusted by controlling the focus detector 36 and the Z-stage 14. In this state (step S5), the observation of the substrate 11 by the observing portion (21 through 35) for the dry-observation system (in other words, the observation with low resolving power) is started. The observer carries out observation of the observation position of the substrate 11 by a monitor connected to the imaging device 34 or an eyepiece 35. During the observation the controller is standing by an instruction from the observer. In accordance with a result of the judgment "whether the substrate 11 has been observed with a sufficient observation magnification or not" in step S6 the flow proceeds to the next step.

When the observer judges that "[the observation is] not a sufficient observation magnification" (in other words, step S6 is "NO"), the controller stops the AF control in step S7, and, in step S8, "whether an objective lens 28 with a higher magnification than the one using now is there or not" is checked. When an objective lens 28 with the higher magnification is there (in the case that the step S8 is YES), the observation is changed to a higher magnification by turning the revolver 29, and the flow returns to the step S3. In other words, the observation position is moved to the center of the field of view of the observing portion (21 through 35) for the dry-observation system.

In this manner, by repeating the processing from step S3 to step S8, the observation magnification is started from a relatively low magnification, gradually increased, and an observing target (the position to be observed) on the substrate 11 can be caught on the field of view upon observing with high resolving power. After observing with the highest observation magnification of the observing portion (21 through 35) for the dry-observation system, when the result of the decision in step S6 is "NO" (in other words, an insufficient observation magnification) and when the result of the decision in step S8 is "NO" (in other words, no objective lens 28 with a higher observation magnification is there), it is judged that "after the observation by the observing portion (21 through 35) for the dry-observation system, the observation by the observing portion (41 through 54, and 32 through 35) for the immersion-objective system is carried out". The flow proceeds to the step S9.

In step S9, the controller controls the XY-stage 13 to position the observation position on the substrate 11 to the field of view of the observing portion (41 through 54, and 32 through 35) for the immersion-objective system by moving the substrate 11 horizontally. In this case, by adjusting the amount of the horizontal movement to the distance between the optical axes 10A and 10B, for example, an observation position on the substrate 11 intersecting the optical axis 10A can be positioned to the optical axis 10B (in other words, the center of the field of view of the observing portion (41 through 54, and 32 through 35) for the immersion-objective system). The state of the arrangement of the optical path change mirror 32 is electrically changed to the state shown in FIG. 2.

In step S10, by controlling the liquid supplier 49 and the discharge nozzle 50, a given amount of the liquid 40 is supplied between the tip of the objective lens 48 and the substrate 11 as described above. The flow proceeds to the step S11, the AF control is started, by controlling the focus detector 55 and the Z-stage 14 the focusing state of the substrate 11 is automatically controlled. In this state (step S12), the observation with the observing portion (41 through 54, and 32 through 35) for the immersion-objective system (in other words, observation with high resolving power) is started. The observer observes the observation position on the substrate 11 by a monitor connected to the imaging device 34 or an eyepiece 35.

When the controller receives an instruction of "termination of the observation with the immersion-objective system" from the observer, the controller stops the AF control in step S13. In step S14, by controlling the absorbing nozzle 51, the liquid collector 52, and the Z-stage 14, the liquid 40 is collected from the space between the tip of the objective lens 48 and the substrate 11 as described above. In other words, the "droplet" is not intended to be left on the substrate 11.

In step S15, "whether the next observation position is there or not on the substrate 11" is checked. If [the next observation position is] there (in other words, "YES" in step S15), the flow returns to step S2. In other words, the observation for the dry-objective system with low resolving power of the next observation position is started. The state of the arrangement of the optical path change mirror 32 is changed as shown in FIG. 1. On the other hand, when the next observation position is not there (in other words, "NO" in the step S15), the flow proceeds to step S16, the substrate 11 is collected from the stages (12 through 14), and the observation process of the substrate 11 is terminated.

In step S6 described above, when the observer's instruction is "sufficient observation magnification" (in other words, "YES" in step S6), the controller stops the AF control in step S17, and the flow proceeds to step S15. In this case, the observation position is not observer by the observing portion (41 through 54, and 32 through 35) for the immersion-objective system.

As described above, in the microscope 10 according to the first embodiment, after observing (with low resolving power) by the observing portion (21 through 35) for the dry-observation system with respect to each observation position on the substrate 11 determined in advance, the observation (with high resolving power) by the observing portion (41 through 54, and 32 through 35) for the immersion-objective system is carried out if necessary, so that the substrate 11 can be effectively observed.

Moreover, since the observing portion (41 through 54, and 32 through 35) for the immersion-objective system is arranged, the observation with high resolving power becomes possible even with visible light (such as the wavelength of 550 nm), so that the system can be constructed at a low cost. In the microscope 10 according to the above-described first embodiment, by using only visible light, the observation with low resolving power and with high resolving power can effectively be carried out.

Furthermore, in the microscope 10 according to the above-described first embodiment, upon observing by the observing portion (41 through 54, and 32 through 35) for the immersion-objective system, since the liquid 40 is automatically supplied and collected, burden to the observer is very small, so that the observation of the substrate 11 can be carried out with a high throughput.

Second Embodiment

Figure 5:
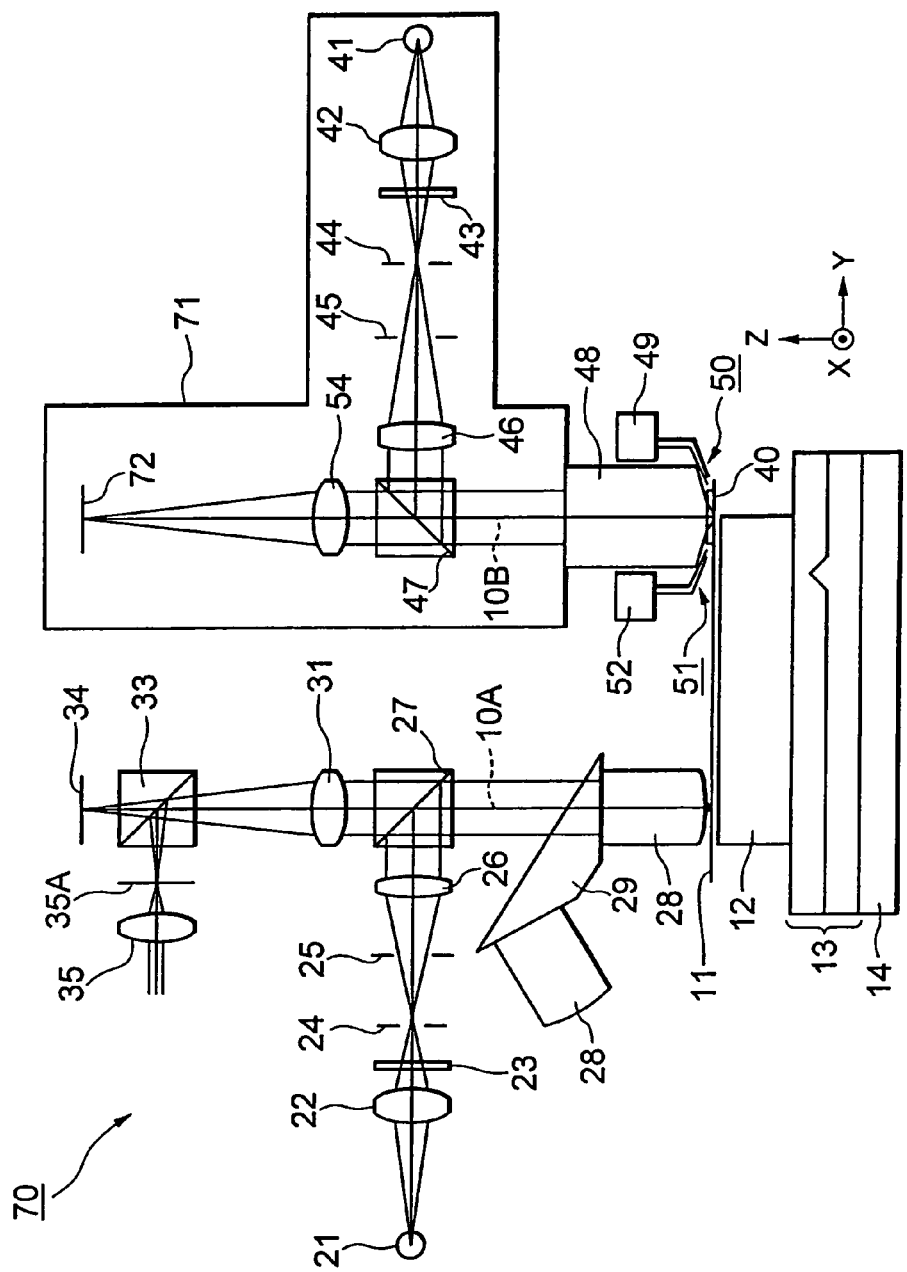
FIG. 5 is a schematic drawing showing the whole construction of a microscope 70 according to a second embodiment of the present invention.

As shown in FIG. 5, a microscope 70 according to a second embodiment omits the mirrors 30 and 53, and the optical path change mirror 32, arranges an imaging device 72 downstream of the imaging optical system 54, and arranges the optical elements (41 through 47, 54, and 72) in a nitrogen chamber 71, and the other construction is the same as FIG. 1. Although omitted in FIG. 5, the similar focus detectors 36 and 55 as shown in FIG. 1 are there in the microscope 70, and the focus detector 55 is arranged in the nitrogen chamber 71.

In the microscope 70 also, the observation of the substrate 11 with low resolving power and with high resolving power can be changed in case of need. The observation with low resolving power is carried out by the observing portion (21 through 35) for the dry-observation system with visible light (such as the wavelength of 400 nm to 700 nm). The observation with high resolving power is carried out by the observing portion (41 through 52, 54, and 72) for the immersion-objective system with ultraviolet light (wavelength of 400 nm or less such as 248 nm).

In this case, when the space between the objective lens 48 of the observing portion (41 through 52, 54, and 72) for the immersion-objective system and the substrate 11 is filled with water, and when the wavelength λ of the light for imaging is 248 nm (ultraviolet light), refractive index becomes about "1.4". Accordingly, when the numerical aperture N.A. of the objective lens 48 is about 1.25, resolving power for two points becomes 121 nm. In other words, by using ultraviolet light in the observing portion (41 through 52, 54, and 72) for the immersion-objective system, very high resolving power can be obtained.

By the way, in the dry-objective system (numerical aperture of 0.9), resolving power for two points is 168 nm at the wavelength of 248 nm, and resolving power for two points is 131 nm at the wavelength of 193 nm. Accordingly, by using ultraviolet light (wavelength of 248 nm) in the immersion-objective system as shown in the second embodiment, it is understood that higher resolving power than the above-mentioned "131 nm" can be obtained.

In the microscope 70 according to the second embodiment, among the observing portion (41 through 52, 54, and 72) for the immersion-objective system the optical elements (41 through 47, 54, and 72) are arranged in the nitrogen chamber 71, and the optical path passed by the ultraviolet light is filled with an inert gas such as nitrogen, so that harmful substances such as ozone are not produced even if deep ultraviolet light source with the wavelength of 250 nm or less is used as the light source 41. For example, when deep ultraviolet light with the wavelength of 200 nm or less is illuminated in the air, various gas molecules included in the air are activated by photochemical reactions and causes damage to the surface of the optical elements. However, when the optical elements of the immersion-objective system is filled with an inert gas, the damage can be reduced. Although the optical path between the objective lens 48 and the substrate 11 locates outside of the nitrogen chamber 71, since the observation with ultraviolet light is carried out after the liquid 40 has been supplied, the ultraviolet light does not cause a photochemical reaction with the ambient air (oxygen). Accordingly, when ultraviolet light is used in the immersion-objective system, there is a merit that the volume of the nitrogen chamber 71 can be small in comparison with the case when ultraviolet light is used in the dry-objective system.

In the second embodiment, only the observing portion (41 through 52, 54, and 72) for the immersion-objective system is filled with nitrogen and the observing portion (21 through 29, 31, 33 through 35) for the dry-objective system is left in the air. Since the dry-objective system is not filled with nitrogen, a revolver 29 used for an ordinary microscope can be used.

When ultraviolet light is used, a cement material in the cemented surface of a cemented lens is deteriorated by the ultraviolet light, so that in the objective lens 48, it is preferable that an objective lens having no cemented lens achromatized with a given wavelength range is used.

Figure 6:
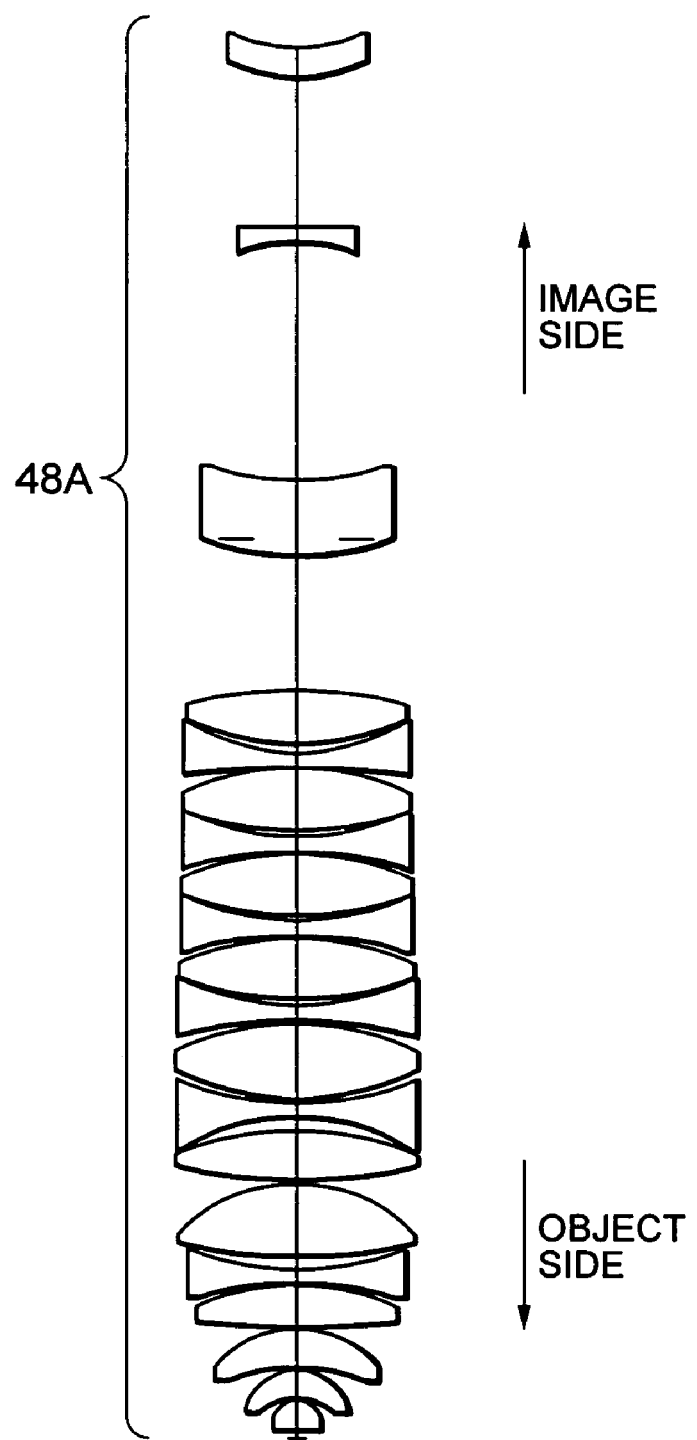
FIG. 6 is a sectional view showing an example of an infinity correction type immersion objective lens 48A.
Figure 7:
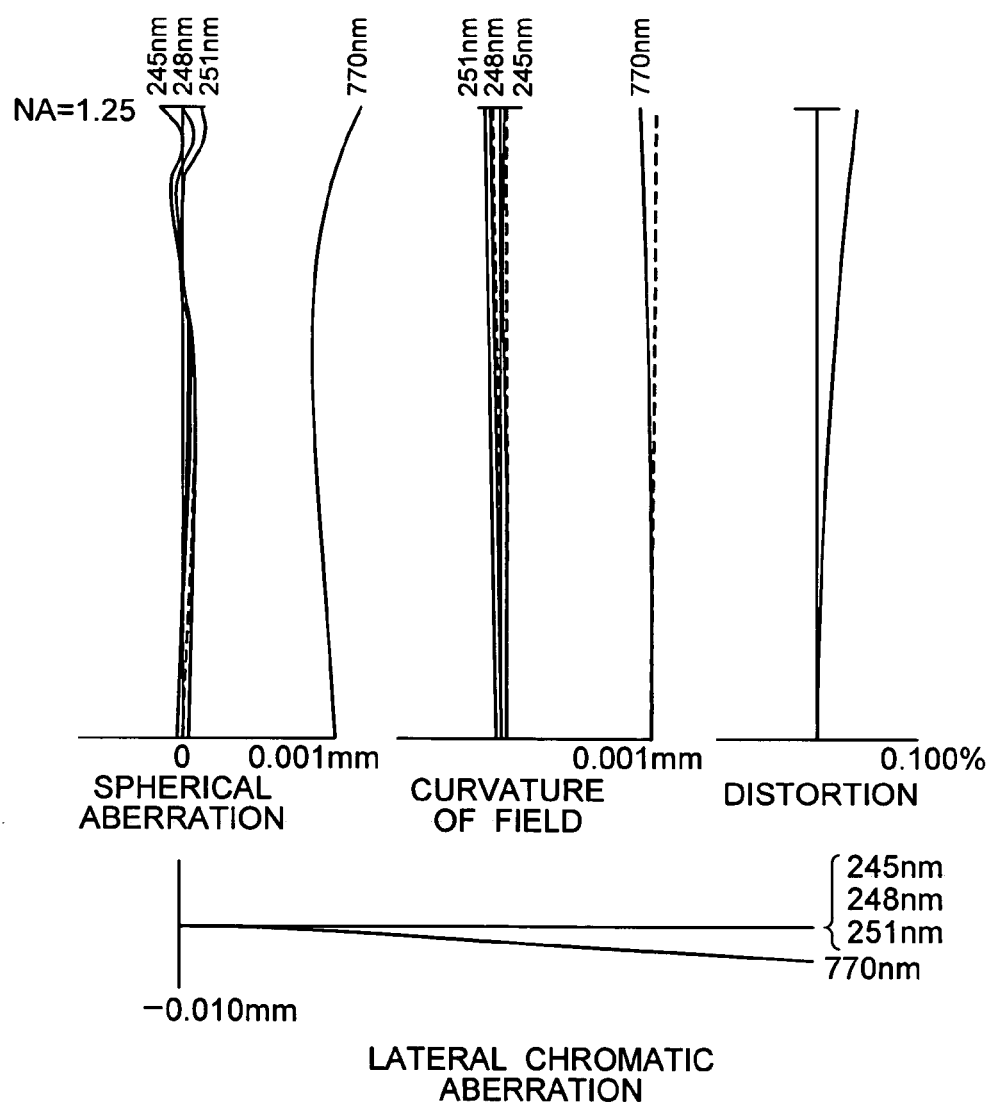
FIG. 7 shows graphs of various aberrations according to the objective lens 48A.

Then, an example of an infinity correction type immersion-objective lens 48 achromatized at the central wavelength of 248 nm with the wavelength range of ±3 nm having the numerical aperture N.A.=1.25 is shown. Table 2 shows the lens data of the objective lens 48. FIG. 6 is a sectional view showing the objective lens 48A. The focal length of the objective lens 48 is about 2 mm. In the objective lens 48, in order to transmit the light for focus detection having the wavelength of 770 nm, spherical aberration at the wavelength of 770 nm is suppressed. However, since the detecting plane of the focus detector optical system and that of the observing optical system is offset by a diverging construction, longitudinal chromatic aberration is not perfectly corrected. Various aberrations of the optical system are schematically shown in FIGS. 7 and 8. By the way, in Table 2, the portion shown by "air" may be nitrogen.

TABLE 2

| surface | Radius of curvature | Central thickness | material |
| --- | --- | --- | --- |
| Sample plane | ∞ | 0.22 | water |
| 1 | −8.000 | 1.60 | quartz |
| 2 | −1.355 | 0.12 | Air |
| 3 | −3.257 | 1.50 | Fluorite |
| 4 | −2.826 | 0.12 | Air |
| 5 | −9.734 | 2.00 | Fluorite |
| 6 | −5.616 | 0.13 | Air |
| 7 | 52.321 | 2.25 | Fluorite |
| 8 | −11.872 | 0.07 | Air |
| 9 | −16.822 | 0.65 | quartz |
| 10 | 15.983 | 0.70 | Air |
| 11 | 27.665 | 3.80 | Fluorite |
| 12 | −8.642 | 0.20 | Air |
| 13 | 27.140 | 2.60 | Fluorite |
| 14 | −16.391 | 0.75 | Air |
| 15 | −11.617 | 0.70 | quartz |
| 16 | 16.675 | 0.17 | Air |
| 17 | 14.010 | 4.00 | Fluorite |
| 18 | −14.565 | 0.20 | Air |
| 19 | −21.523 | 0.73 | quartz |
| 20 | 14.397 | 0.35 | Air |
| 21 | 18.766 | 3.20 | Fluorite |
| 22 | −15.182 | 0.15 | Air |
| 23 | −20.705 | 0.73 | quartz |
| 24 | 14.461 | 0.35 | Air |
| 25 | 18.558 | 3.20 | Fluorite |
| 26 | −15.219 | 0.15 | Air |
| 27 | −20.705 | 0.73 | quartz |
| 28 | 14.461 | 0.35 | Air |
| 29 | 18.558 | 3.20 | Fluorite |
| 30 | −15.219 | 0.10 | Air |
| 31 | −49.216 | 0.75 | quartz |
| 32 | 11.095 | 0.56 | Air |
| 33 | 14.659 | 2.80 | Fluorite |
| 34 | −23.499 | 7.1 | Air |
| 35 | 14.662 | 3.90 | quartz |
| 36 | 14.640 | 12.49 | Air |
| 37 | −8.332 | 0.75 | Fluorite |
| 38 | 141.266 | 7.74 | Air |
| 39 | 7.995 | 1.50 | quartz |
| 40 | 8.809 | −25.567 | Air |
| Pupil plane | ∞ | | |

In the second embodiment, the imaging device 34 for a visible/dry-objective system and that for an ultraviolet/immersion-objective system are different construction. This is because the sensitivity of the imaging device for visible light is different from that for ultraviolet light. For visible light, an imaging device such as a color CCD capable of accepting color information is preferably used, and for ultraviolet light, an imaging device such as a monochromatic CCD having sensitivity to the ultraviolet light is preferably used. Two imaging devices 34 and 72 may be connected to a common monitor or to separate monitors. In the case of a common monitor, when the dry-objective system and the immersion-objective system are changed upon observing the substrate 11, either one image may be displayed on the monitor by changing input image to the monitor with an electrical switch.

Although the field of view to be observed is determined by the image plane size of the imaging device and the observation magnification, when an imaging device such as a CCD is used, the image plane size is different device by device, so that the real field of view is not determined by only the magnification of the optical system. There are various kinds of CCD are put on the market. Among them, a ⅔inch device (effective image area is 8.8 mm by 6.6 mm) is easy to use for a microscope (see Table 3). There are not much choice for ultraviolet light. Among them, a device with the effective image area of 8 mm by 8 mm is available. By the way, in Table 3, 8 mm by 8 mm is denoted by 8 mm□ and 40 μm by 40 μm is denoted by 40 μm□. The magnification itself of the optical system may be changed by changing the focal length of the imaging lens to that for visible light. When an imaging device is used for imaging, since accommodation of an eye does not work, the depth of focus D is expressed by the following expression (1):

$$D = (n\lambda)/(2N.A.^2) \tag{1}$$

where λ denotes the wavelength of the light, N.A. denotes the numerical aperture of the objective lens, and n denotes refractive index.

TABLE 3

| | wavelength | | |
|---|---|---|---|
| | 550 nm | 193 nm | 248 nm |
| magnification | Dry 100× | Dry 200× | Water 200× |
| Numerical aperture | 0.90 | 0.90 | 1.25 |
| resolving power | 372 nm | 131 nm | 121 nm |
| CCD size | 8.8 mm by 6.6 mm | 8 mm□ | 8 mm□ |
| Real field of view | 88 μm by 66 μm | 40 μm□ | 40 μm□ |
| Depth of focus | 0.34 μm | 0.12 μm | 0.11 μm |

Figure 4:
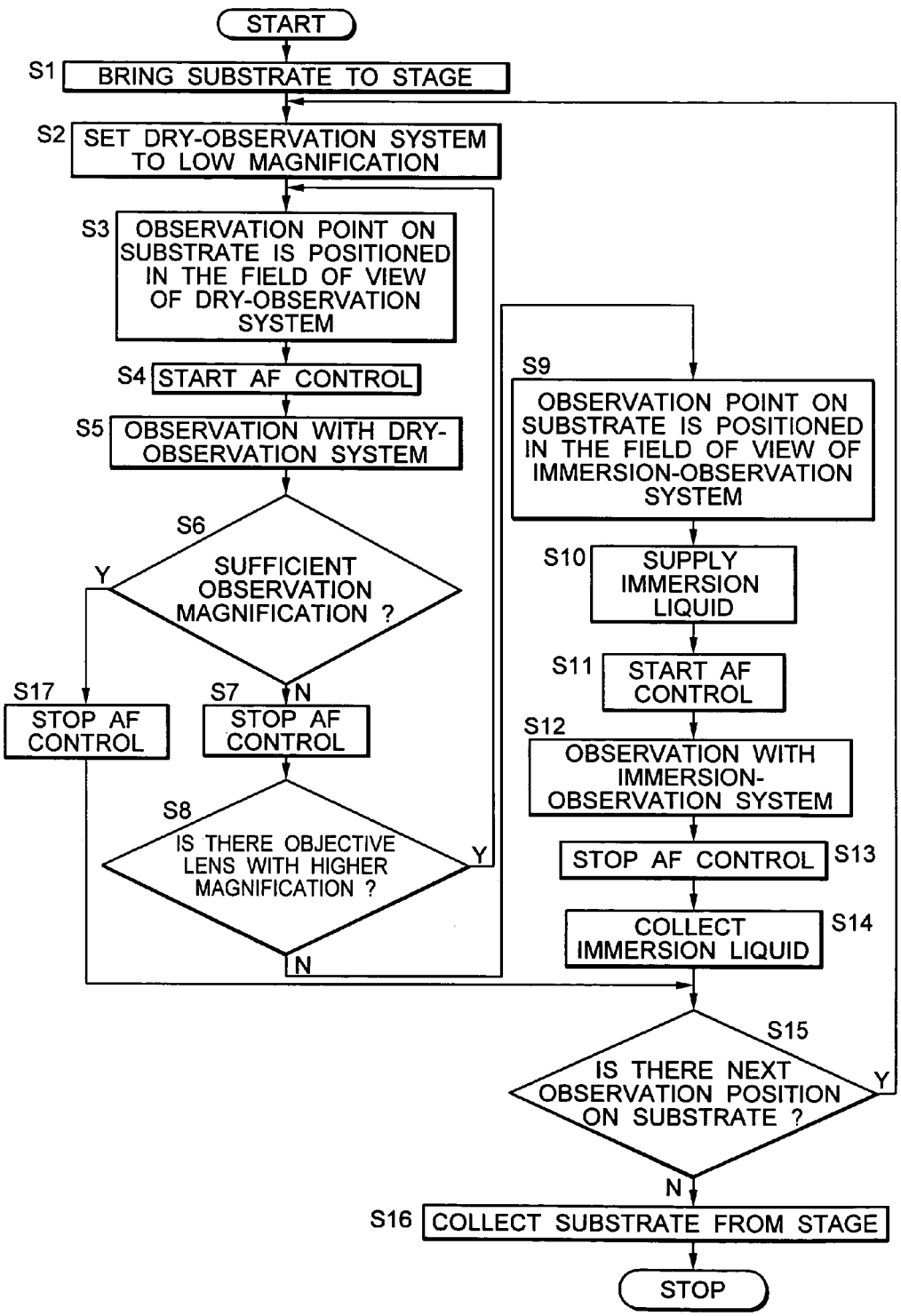
FIG. 4 is a flowchart showing observation procedure of a substrate 11 by the microscope 10 according to the first embodiment of the present invention.

In the microscope 70 according to the second embodiment, the observation procedure of the substrate 11 is carried out, for example, by the similar procedure (as shown in FIG. 4). Accordingly, since after observing with low resolving power by the observing portion (21 through 29, 31, 33 through 35) for the dry-objective system to each observation position on the substrate 11 determined in advance, the observation with high resolving power by the observing portion (41 through 52, 54, and 72) for the immersion-objective system is carried out if necessary, so that an effective observation of the substrate 11 can be carried out.

Moreover, by arranging the observing portion (41 through 52, 54, and 72) for the immersion-objective system, it becomes possible to observe with high resolving power even by visible light (such as the wavelength of 550 nm), so that the system can be constructed at a low cost. In addition, in the second embodiment, since the optical elements (41 through 52, 54, and 72) of the immersion-objective system is arranged in the nitrogen chamber 71, it becomes possible to use ultraviolet light (wavelength of 400 nm or less such as 248 nm), so that the observation with higher resolving power than a conventional ultraviolet/dry-objective system can be carried out.

Furthermore, in the microscope 70 according to the second embodiment, upon observing by the observing portion (41 through 52, 54, and 72) for the immersion-objective system, since the liquid 40 is automatically supplied and collected, burden to the observer is very small, so that the observation of the substrate 11 can be carried out with a high throughput.

Modified Embodiment

In the above-described embodiments, although the observation of the substrate 11 is carried out in accordance with the procedure of the flowchart shown in FIG. 4, the present invention is not limited to this. For example, when the checked result of step S8 shown in FIG. 4 is "NO" (in other words, an objective lens 28 with the higher magnification than now is not there), the position information of the observation position (such as the position of the XY-stage 13 when the observation position is positioned to the center of the field of view of the dry-objective system) is stored in the memory of the controller, and the similar processing is carried out to all observation position on the substrate 11 in turn, after completing the observation by the dry-objective system, the observation by the immersion-objective system may be carried out by controlling the XY-stage 13 on the basis of the position information stored in the memory of the controller. According to the procedure, the time to change the dry-objective system to the immersion-objective system by each observation position can be omitted, so that total processing time can be shortened.

In the case the procedure is used, the process to supply/collect the liquid 40 can be changed as shown below. When the distance to the next observation position is short upon observing by the immersion-objective system, the XY-stage 13 (in other words, the substrate 11) may be moved without collecting the liquid 40 supplied to the present observation position. When the surface of the substrate 11 has a certain measure of hydrophobicity and the tip of the objective lens 48 a certain measure of hydrophilicity, the liquid 40 becomes a droplet (waterdrop) and tends to go on sticking to the objective lens 48. Accordingly, the liquid 40 can be stuck on the tip of the objective lens 48 even if the XY-stage 13 (in other words, the substrate 11) is moved, so that when reaching the next observation position, the observation can be carried out by using the same liquid 40. Whether the liquid 40 is to be collected or not may be judged such that the moving distance to the next observation position is calculated on the basis of the position information stored in the memory of the controller and is compared with a given distance. When the result of the comparison is within the given distance, the stage is moved to the next observation position without collecting the liquid 40.

In the above-described embodiments, although the immersion-objective system using the liquid 40 such as pure water is explained, the present invention is not limited to this. An oil-immersion-objective system using oil (such as immersion oil or silicon oil) having higher refractive index than pure water as the liquid 40 may be possible. In this case, in order to move the XY-stage 13 (in other words, the substrate 11) with sticking the liquid 40 on the tip of the objective lens 48, it is preferable that the surface of the substrate 11 has a certain measure of hydrophilicity and the tip of the objective lens 48 has a certain measure of hydrophobicity.

A liquid with smaller surface tension than pure water (such as water added with a surfactant, an organic solvent such as a kind of alcohol, a mixture of an organic solvent and pure water) may be used as the liquid 40. In this case, even if the circuit pattern on the substrate 11 is minute, the liquid 40 can securely penetrate into the concavities of the circuit pattern, so that good observation can be carried out. In particular, when the pattern to be observed is a resist pattern, collapse of the resist pattern by the surface tension of the liquid upon collecting the liquid 40 can be prevented, so that when observing a minute pattern of 100 nm or less, nondestructive test becomes possible.

Moreover, in the above-described embodiments, after the observation by the immersion-objective system, in order to remove the liquid 40 from the substrate 11, although the liquid 40 is collected by using the absorbing nozzle 51 and the liquid collector 52, the present invention is not limited to this. The liquid 40 may be removed by using any drying means (such as a vacuum dry). In order to take the tested substrate into the next assembly line without destroying thereof, it is preferable that a super critical dryer is put beside a microscope or included in a microscope in order to remove the liquid 40. In this case, it is needless to say that the discharge nozzle need not to be arranged to the objective lens. After all observations have been completed, the substrate is transferred to the super critical dryer and the liquid is removed.

In the above-described embodiments, although the imaging light is diverged to both of the imaging device 34 and the eyepiece 35 by the fixed diverging prism 33, the present invention is not limited to this. A movable diverging prism or mirror may be put in and out at the position of the diverging prism 33. In this case, the imaging light can be led to either one of the imaging device 34 or the eyepiece 35, so that the quantity of light can be secured.

Moreover, an image contrast method may be used as the focus detector 36 and 55. In this case, since the Z position where the maximum image contrast is obtained is derived, there is no need to correct moving amount of the Z-stage 14 even in the immersion-objective system.

In the above-described embodiments, although the volume V0 is calculated by the approximation expression (14) as the most appropriate amount of supply V of the liquid 40, the present invention is not limited to this. For example, when the shape of the exposed surface of the liquid 40 is considered to become the one shown in FIG. 13, it is preferable that the volume V0 is calculated by an approximation expression (15). The approximation expression (15) assumes that the cross sectional shape of the annular space 2B (see FIG. 10B) is a half circle of the radius of $\delta/2$.

$$V0 = 2\pi \int_0^{\frac{\delta}{2}} \left\{ \frac{d}{2} + \frac{\delta}{2}\sqrt{1 - \left(1 - \frac{2}{\delta}x\right)^2} \right\}^2 dx \quad (15)$$

Figure 13:
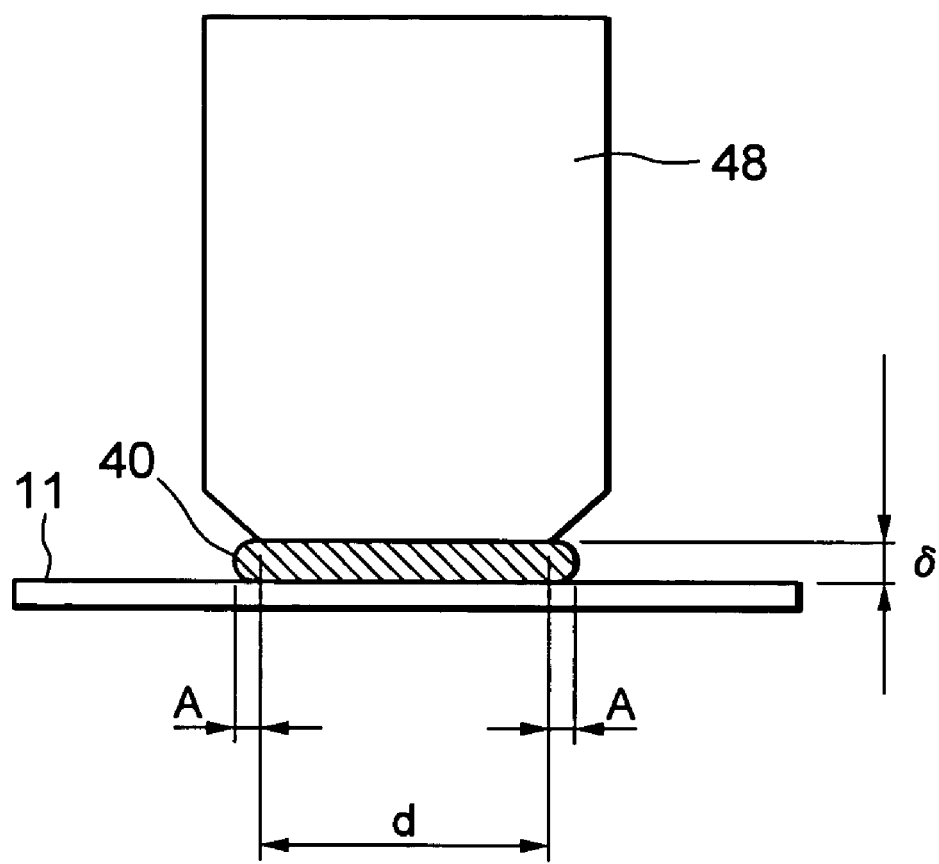
FIG. 13 is a side view showing the shape of the liquid 40.

By the way, when the specific gravity of the liquid 40 is relatively small, the surface shape shown in FIG. 13 is realistic, so that it is preferable to use the approximation expression (15). When the specific gravity of the liquid 40 is relatively large, the surface shape shown in FIG. 10A is realistic, so that it is preferable to use the approximation expression (14). However, when the working distance $\delta$ of the objective lens 48 is small (about $\delta \leq 0.5$ mm), either the approximation expression (14) or (15) gives almost the same calculation results of the volume V0. Accordingly, either approximation expression may be used.

What is claimed is:
1. A microscope comprising:
a microscope optical system that forms an enlarged image of an observation portion by an immersion objective lens with an immersion liquid filled between the observation portion and the objective lens;
a moving mechanism that moves a state of a first observation portion among a plurality of observation portions on a substrate that is positioned in a field of view of the microscope to another state, so that a second observation portion is positioned in the field of view of the microscope;
an immersion supplier that supplies the immersion liquid to fill between the objective lens and the observation portion;
an immersion remover that removes the immersion liquid filled between the objective lens and the observation portion; and
an immersion remove controller configured to output a first signal that controls the immersion remover remove the immersion liquid before operating the moving mechanism and to output a second signal that controls the immersion supplier refill the immersion liquid into an area between the objective lens and the observation portion after the moving mechanism has been operated.

2. The microscope according to claim 1, wherein the moving mechanism is comprised of a stage that holds the substrate having a plurality of observation portions movably in a given area, and a stage controller that drives the stage on the basis of position information of the plurality of observation portions on the substrate, and wherein the stage controller drives the stage such that after the immersion liquid is removed by the immersion remover, a next observation portion comes to the field of view of the objective lens.

3. The microscope according to claim 2, wherein the immersion supplier has a discharge nozzle, a tip of the discharge nozzle is arranged to a given position in the vicinity of the substrate, the stage controller moves the observation portion to right under the tip of the discharge nozzle, the immersion liquid is supplied to the observation portion from the discharge nozzle, then the observation portion supplied with the immersion liquid is moved to the field of view of the objective lens, and an image of the observation portion is formed by the microscope.

4. The microscope according to claim 1, further comprising an automatic adjuster that adjusts a focusing state of the microscope after the immersion liquid supplied by the immersion supplier is filled between a tip of the objective lens and the substrate before the immersion liquid is removed by the immersion remover.

5. The microscope according to claim 1, wherein the immersion remover has an absorbing nozzle and a tip of the absorbing nozzle is arranged in the vicinity of a tip of the objective lens.

6. The microscope according to claim 1, wherein the immersion supplier has a discharge nozzle and a tip of the discharge nozzle is arranged in the vicinity of a tip of the objective lens.

7. The microscope according to claim 1, wherein the immersion supplier supplies at least an amount filled with the space between the tip of the objective lens and the substrate in the state of forming the enlarged image.

8. The microscope according to claim 1, further comprising:
a microscope optical system that forms images of the plurality of observation portions by a dry objective lens;
a memory that stores a position of a given observation portion among the plurality of observation portions on the basis of the images of the plurality of observation portions formed by the dry objective lens; and a controller that controls the moving mechanism to move the position of the observation portion stored in the memory to the field of view of the immersion objective lens in turn on the basis of the position information stored in the memory, and forms an image of each observation portion by the immersion objective lens.

9. The microscope according to claim 1, further comprising:
a microscope optical system that forms images of the plurality of observation portions by a dry objective lens;
a first controller that controls the moving mechanism to position the plurality of observation portions to a field of view of the dry objective lens in turn and forms an image by the dry objective lens;
a judge means that judges whether an image is to be formed by the immersion objective lens after forming an image by the dry objective lens; and
a second controller that controls the moving mechanism to position the observation portion to the field of view of the immersion objective lens and forms an image by the immersion objective lens when the judged result of the judge means is to carry out observation by the immersion objective lens.

10. The microscope according to claim 1, further comprising:
a microscope optical system that forms images of the plurality of observation portions by a dry objective lens;
a first controller that controls the moving mechanism to position the plurality of observation portions to a field of view of the dry objective lens in turn and forms an image by the dry objective lens;
a memory that stores position information of the observation portion when an image is to be formed by the immersion objective lens after forming an image by the dry objective lens; and
a second controller that controls the moving mechanism to position the observation portion to the field of view of the immersion objective lens on the basis of the position information stored in the memory and forms an image by the immersion objective lens.

11. The microscope according to claim 1, wherein the immersion liquid is pure water.

12. The microscope according to claim 1, wherein the working distance of the immersion objective lens is 0.1 mm or more and 0.5 mm or less.

13. The microscope according to claim 1, wherein the immersion objective lens forms an image of the substrate with ultraviolet light.

14. The microscope according to claim 1, further comprising:
a positioning means that positions the observation portion in the vicinity of the optical axis of the objective lens within the focal plane of the objective lens while the immersion liquid is supplied to the observation portion; and
wherein the immersion remover has an absorbing part for absorbing the immersion liquid in the vicinity of the tip of the objective lens, and removes the immersion liquid from the observation portion by bringing the substrate near to the objective lens in the positioned state by the positioning means.

15. The microscope according to claim 1, further comprising:

a first positioning means that positions the substrate to a plane located farther away from the objective lens than the focal plane of the objective lens; and
a second positioning means that positions the observation portion in the vicinity of the optical axis of the objective lens on the focal plane of the objective lens while the immersion liquid is supplied to the observation portion; and
wherein the immersion supplier supplies the immersion liquid to the observation portion of the substrate in the state where the substrate is positioned to the plane located farther away, and the immersion remover has an absorbing portion for absorbing the immersion liquid locating in the vicinity of the tip of the objective lens and removes the immersion liquid from the observation portion with bringing the substrate near to the objective lens from the state positioned by the second positioning means.

16. The microscope according to claim 15, wherein the immersion supplier supplies the immersion liquid to a target locating in the vicinity of the optical axis on the plane located farther away, and the first positioning means positions the observation portion on the substrate in the vicinity of the optical axis on the plane located farther away.

17. A microscope comprising:
a microscope optical system that forms an enlarged image of an observation portion by an immersion objective lens with an immersion liquid filled between the observation portion and the objective lens;
a moving mechanism that moves a state of a first observation portion among a plurality of observation portions on a substrate that is positioned in a field of view of the microscope to another state, so that a second observation portion is positioned in the field of view of the microscope;
an immersion supplier that supplies the immersion liquid to fill between the objective lens and the observation portion;
an immersion remover that removes the immersion liquid filled between the objective lens and the observation portion; and
an immersion remove controller that makes the immersion remover remove the immersion liquid before operation of the moving mechanism and makes the immersion supplier refill the immersion liquid into an area between the objective lens and the observation portion after having operated the moving mechanism, wherein the immersion supplier supplies the amount of immersion liquid corresponding to a volume V0 satisfied by the following expression:

$$V0 = V1 + V2$$

where V1 denotes a volume of a cylindrical space between a tip of the objective lens and the observation portion, V2 denotes a volume of an annular space capable of sticking out from the tip of the objective lens by a surface tension.

18. The microscope according to claim 17, wherein the annular space with the width A of the amount of sticking out from the tip of the objective lens satisfies the following conditional expression:

$$\delta/2 \leq A \leq 2\delta$$

where $\delta$ denotes the working distance of the objective lens.

19. The microscope according to claim 17, further comprising an immersion liquid supply controller that controls the immersion supplier to start supplying the immersion, and to stop supplying the immersion when the amount of supply of the immersion reaches the volume V0.

20. A method for forming an enlarged image of an observation portion by an immersion objective lens of a microscope, the method comprising steps of:

moving a state of an observation portion to another state of an observation portion by a moving mechanism, so that a first observation portion is positioned in a field of view of the microscope;

supplying an immersion liquid to fill between the objective lens and the first observation portion by an immersion supplier in accordance with a first instruction given by an immersion controller;

observing the first observation portion by the objective lens; outputting a second instruction to an immersion remover by the immersion controller that instructs the immersion remover to remove the immersion liquid before beginning operation of the moving mechanism;

removing the immersion liquid filled between the objective lens and the first observation portion by the immersion remover in accordance with the second instruction given by the immersion controller;

moving a state of the first observation portion among a plurality of observation portions on a substrate that is positioned in the field of view of the microscope to another state by the moving mechanism, so that a second observation portion is positioned in the field of view of the microscope;

outputting a third instruction to the immersion supplier by the immersion controller that instructs the immersion supplier to supply immersion liquid after operation of the moving mechanism;

supplying the immersion liquid into an area between the objective lens and the second observation portion by the immersion supplier in accordance with the third instruction given by the immersion controller; and observing the second observation portion by the objective lens.

\* \* \* \* \*